United States Patent
Ohashi

(10) Patent No.: US 7,589,910 B2
(45) Date of Patent: Sep. 15, 2009

(54) ZOOM LENS, CAMERA, AND PERSONAL DIGITAL ASSISTANT

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 182 days.

(21) Appl. No.: 11/771,300

(22) Filed: Jun. 29, 2007

(65) Prior Publication Data

US 2008/0106799 A1    May 8, 2008

(30) Foreign Application Priority Data

Jun. 30, 2006  (JP)  .............................. 2006-182843
Sep. 29, 2006  (JP)  .............................. 2006-269663

(51) Int. Cl.
   *G02B 15/14* (2006.01)
(52) U.S. Cl. ...................................... 359/689
(58) Field of Classification Search .................. 359/689
   See application file for complete search history.

(56) References Cited

U.S. PATENT DOCUMENTS

| 5,398,135 | A | 3/1995 | Ohashi |
| 5,576,891 | A | 11/1996 | Ohashi |
| 5,604,637 | A | 2/1997 | Goosey, Jr. |
| 5,617,254 | A | 4/1997 | Ohashi |
| 6,771,433 | B2 | 8/2004 | Ohashi |
| 7,095,564 | B2 | 8/2006 | Ohashi |
| 7,164,542 | B2 | 1/2007 | Ohashi |
| 2002/0191306 | A1 | 12/2002 | Toyama |
| 2004/0004772 | A1 | 1/2004 | Ohashi et al. |
| 2005/0231816 | A1 | 10/2005 | Obama et al. |
| 2008/0151385 | A1 | 6/2008 | Ohashi |

FOREIGN PATENT DOCUMENTS

| EP | 1 220 002 A2 | 7/2002 |
| JP | 8-110468 | 4/1996 |
| JP | 10-123418 | 5/1998 |
| JP | 2000-249900 | 9/2000 |
| JP | 2001-281545 | 10/2001 |

(Continued)

OTHER PUBLICATIONS

U.S. Appl. No. 11/873,078, filed Oct. 16, 2007, Ohashi.

(Continued)

*Primary Examiner*—William C Choi
(74) *Attorney, Agent, or Firm*—Oblon, Spivak, McClelland, Maier & Neustadt, P.C.

(57) ABSTRACT

The zoom lens includes a first lens group G1 having a negative refracting power, an aperture stop FA, a second lens group G2 having a positive refracting power, and a third lens group G3 having a positive refracting power, which are disposed in order from an object side. In this configuration, at least the first lens group G1 and the second lens group G2 move along with changing magnification from the wide-angle end toward the telephoto end, in a manner that a spacing between the first lens group G1 and the second lens group G2 decreases gradually and a spacing between the second lens group G2 and the third lens group G3 increases gradually. Here, the second lens group G2 includes a first cemented lens C1 having at least three pieces of lenses united, and a second cemented lens C2 having at least two pieces of lenses united.

10 Claims, 12 Drawing Sheets

FOREIGN PATENT DOCUMENTS

| | | |
|---|---|---|
| JP | 2001-324676 | 11/2001 |
| JP | 3264702 | 12/2001 |
| JP | 3323303 | 6/2002 |
| JP | 2002-244039 | 8/2002 |
| JP | 3404172 | 2/2003 |
| JP | 2003-107348 | 4/2003 |
| JP | 2003-241091 | 8/2003 |
| JP | 3458033 | 8/2003 |
| JP | 2004-102211 | 4/2004 |
| JP | 2004-198855 | 7/2004 |
| JP | 2004-325975 | 11/2004 |
| JP | 2005-24804 | 1/2005 |
| JP | 2005-37576 | 2/2005 |
| JP | 2005-148420 | 6/2005 |
| JP | 2006-39523 | 2/2006 |
| JP | 2006-113554 | 4/2006 |
| JP | 2007-114378 | 5/2007 |
| JP | 2008-158481 | 7/2008 |

OTHER PUBLICATIONS

U.S. Appl. No. 12/102,257, filed Apr. 14, 2008, Ohashi.

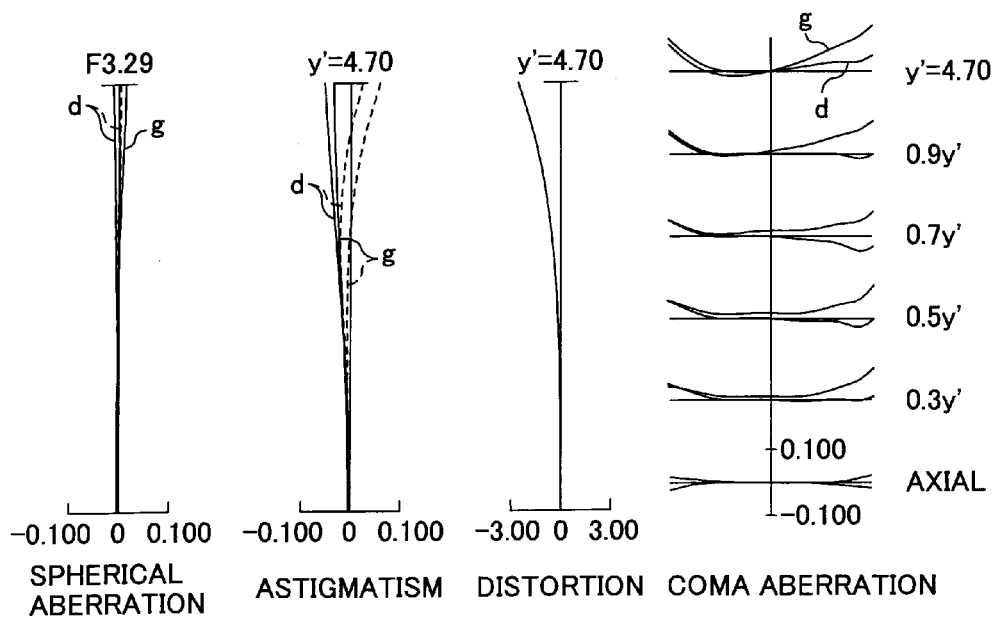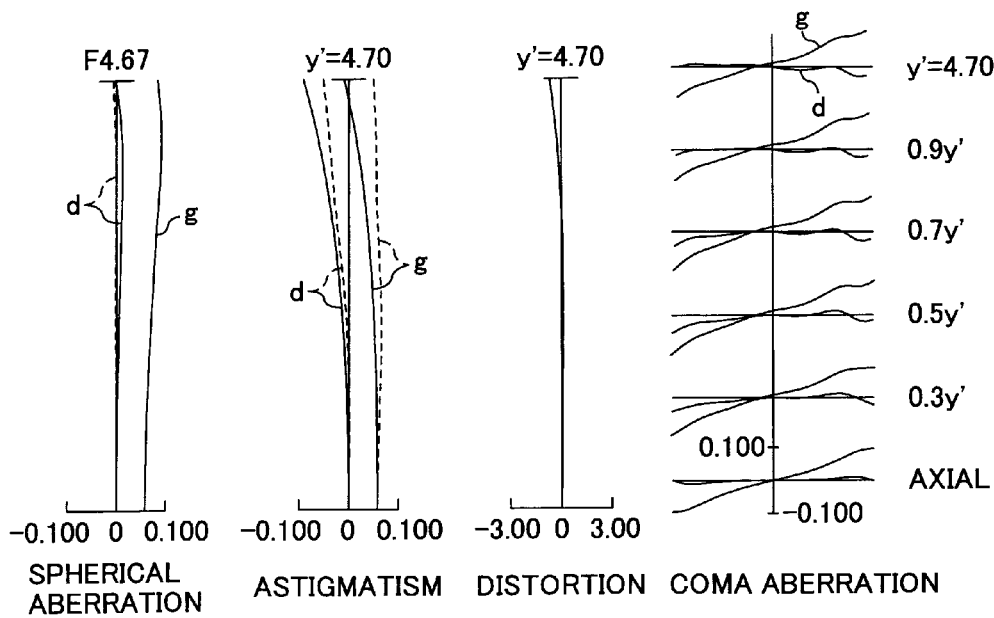

ZOOM LENS, CAMERA, AND PERSONAL DIGITAL ASSISTANT

PRIORITY CLAIM

This application claims priority from Japanese Patent Application No. 2006-182843, filed with the Japanese Patent Office on Jun., 30 2006, and Japanese Patent Application No. 2006-269663, filed with the Japanese Patent Office on Sep. 29, 2006, the contents of which are incorporated herein by reference in their entirety.

BACKGROUND OF THE INVENTION

1. Field of the Invention

The present invention relates to a zoom lens capable of selecting and setting a focal length as desired within a predetermined range of the focal length, which is also capable of achieving a wide angle of view at the wide-angle end and a high changing magnification rate in addition to a small size and a high performance; it specifically relates to a zoom lens suitable for a camera using an electronic photographing means such as a digital camera and a video camera, which is also applicable to a film-based camera using a silver halide film, and a camera and a personal digital assistant using the above zoom lens.

2. Related Art

The traditional camera using a long established silver halide film, that is, the film-based camera has been replaced by the so-called digital camera or electronic camera, which photographs an object by a solid imaging device such as a CCD (charge coupled device), acquires image data of the object as a still image or an animated image, and records the data in a digital format such as a nonvolatile semiconductor memory represented by a flash memory. This type of camera has been wide spread as a single camera, as well as having been mounted on mobile phones and other personal digital assistants; it has also been applied to a new and novel use to the film-based camera.

The market for such a digital camera has been huge, and the users' demands for the digital camera range over many divergences. Among them, a higher image quality and a smaller size are always demanded by the users, and they form a great weight of the users' demands. Thus, both a higher performance and a smaller size are demanded also to the zoom lens used as a photographing lens.

Here, in view of seeking a smaller size, it is necessary to shorten a whole lens length of the zoom lens, that is, a distance between a lens surface on the most object side and an image surface. In view of seeking a higher performance, it is necessary that the zoom lens possesses a resolving power corresponding to an imaging device of at least about 8-10 million pixels, over the whole zooming range.

Besides, many users desire a wider angle of view of the photographing lens; and the half angle of view at the short focal end of the zoom lens, namely, the half angle of view at the wide-angle end thereof is desired to be 38 degrees or more. Among specialist photographers, namely, professional photographers, or lovers of photographs being called high amateurs, who have highly professional knowledge and techniques being comparable to those of the professionals, not a few desire a wider half angle of view of 42 degrees or more. The 38 degrees and 42 degrees in the half angle of view correspond to 28 mm and 24 mm in the focal length, respectively, when they are converted into the focal length in the 35 mm film-based camera using the 35 mm (the so-called Leica) silver halide film.

There are quite a few types conceivable as the zoom lens for the digital camera. The following zoom lens can be quoted as a type suitable for a smaller side. The zoom lens includes a first lens group having a negative refracting power, a second lens group having a positive refracting power, a third lens group having a positive refracting power, which are disposed in order from the object side, and an aperture stop that moves in one united body with the second lens group on the object side of the second lens group, wherein the second lens group moves monotonously from the image side toward the object side along with changing magnification from the wide-angle end toward the telephoto end, and the first lens group moves so as to correct the fluctuations of an image surface position along with the changing magnification.

Among such zoom lenses, there is a well-known configuration having united surfaces at two places of the second lens group, in order to perform a satisfactory correction of axial chromatic aberrations and power chromatic aberrations, or to control a deterioration of image-forming performances due to a decentering among the lenses.

For example, the zoom lens that includes two pairs of cemented lenses in the second lens group is disclosed in JP2001-281545A, JP2003-107348A, JP2003-241091A, and JP2006-113554A. And, for example, the zoom lens that includes three cemented lenses in the second lens group is disclosed in JP2004-102211A, JP2004-325975A, JP2005-24804A, JP2005-37576A, and JP2006-39523A.

JP2001-281545A discloses, in the embodiment 1 through the embodiment 8 thereof, that a satisfactory correction of axial chromatic aberrations and power chromatic aberrations can be achieved by using two pairs of cemented lenses to the second lens group. However, the half angle of view is smaller than 34 degrees, which cannot be said sufficient in view of seeking a wider angle of view.

In the same manner, JP2003-241091A discloses, in the embodiments 11 and 12 thereof, that a satisfactory correction of axial chromatic aberrations and power chromatic aberrations can be achieved by using two pairs of cemented lenses to the second lens group. Also in this case, the half angle of view is lower than 34 degrees, which is insufficient in view of seeking a wider angle of view.

JP2004-102211A discloses, in the embodiments 11, 15, and 17 thereof, a configuration that applies three cemented lenses to the second lens group in consideration for a deterioration of image-forming performances due to a decentering among the lenses. Also in this configuration, the half angle of view is lower than 33 degrees, which is insufficient in view of seeking a wider angle of view.

In the same manner, JP2004-325975A, JP2005-37576A, and JP2006-39523A disclose a configuration that applies three cemented lenses to the second lens group in consideration for a deterioration of image-forming performances due to a decentering among the lenses, whereby the whole size of the zoom lens can be made up relatively small. However, the half angle of view is about 30 to 33 degrees, which is also insufficient in view of seeking a wider angle of view.

JP2003-107348A discloses a zoom lens that applies two pairs of cemented lenses to the second lens group to thereby achieve a satisfactory correction of axial chromatic aberrations and power chromatic aberrations, and attain a relatively wide half angle of view of about 39 degrees, which, however, cannot be said sufficient to the demand for the half angle of view of 42 degrees or more.

JP2005-24804A discloses a zoom lens that applies three cemented lenses to the second lens group to thereby achieve a satisfactory correction of axial chromatic aberrations and power chromatic aberrations, and attain a relatively wide half angle of view of about 39 degrees, which, however, cannot be said sufficient to the demand for the half angle of view of 42 degrees or more, in the same manner as the case with the JP2003-107348A.

JP2006-113554A discloses a zoom lens, in a part of the embodiments thereof, that uses two pairs of cemented lenses to the second lens group to attain a wide half angle of view of 43 degrees or more, which is a sufficiently wide angle of view.

However, in order to achieve a satisfactory correction of power chromatic aberrations, a low dispersive glass of the Abbe number of 80 or more is used to the negative lens of the first lens group. The low dispersive glass of the Abbe number of 80 or more is the so-called special low dispersive glass, the material cost thereof is high, the degree of processing difficulty is high, and the yield becomes decreased as the lens size becomes increased. In the usual processing of lenses, a process is included which cleans individual lenses by an ultrasonic cleaning, for example. However, the lens of a special low dispersive glass cannot be cleaned by the ultrasonic cleaning, which is simple and widely used, and the hand work called hand cleaning with a cloth becomes inevitably necessary. Accordingly, as the lens size becomes larger, the processing of the lens becomes more difficult, and the yield becomes lowered. Therefore, the use of it to such a place as the first lens group, where the diameter of lens is apt to increase, sharply raises the cost of the lens system, which is not preferred.

Accordingly, there is a need for a zoom lens that various aberrations are effectively controlled without a remarkable increase of the manufacturing cost, a sufficient wide angle of view is achieved at the wide-angle end, and a smaller size as well as a higher resolving power is realized. There is also a need for a camera and a personal digital assistant using such a zoom lens.

SUMMARY OF THE INVENTION

The present invention is directed to a zoom lens that satisfies this need. The present invention is also directed to a camera and personal digital assistant including the lens zoom lens therein, respectively.

One aspect of the present invention involves a zoom lens comprises a first lens group having a negative refracting power; a second lens group having a positive refracting power, the first lens group and the second lens group disposed in order from an object side; and an aperture stop disposed on the object side of the second lens group, moving with the second lens group, wherein along with changing magnification from a wide-angle end toward a telephoto end, at least the first lens group and the second lens group move, in a manner that a spacing between the first lens group and the second lens group decreases and a spacing between the second lens group and an image surface increases, and the second lens group comprises a first cemented lens having at least three pieces of lenses united; and a second cemented lens having at least two pieces of lenses united.

Another aspect of the present invention involves a zoom lens comprises a first lens group having a negative refracting power; a second lens group having a positive refracting power; a third lens group having a positive refracting power, the first lens group, the second lens group and the third lens group disposed in order from an object side; and an aperture stop disposed on the object side of the second lens group, moving with the second lens group, wherein along with changing magnification from a wide-angle end toward a telephoto end, at least the first lens group and the second lens group move, in a manner that a spacing between the first lens group and the second lens group decreases and a spacing between the second lens group and the third lens group increases, and the second lens group, comprising: a first cemented lens having at least three pieces of lenses united; and a second cemented lens having at least two pieces of lenses united.

Preferably, the second cemented lens is disposed on an image side of the first cemented lens, both a most object side surface of the first cemented lens and a most image side surface of the first cemented lens are convex toward the object side, and the second cemented lens has a positive refracting power as a whole.

Preferably, the second cemented lens is disposed on an image side of the first cemented lens, the first cemented lens has three pieces of a positive lens, a negative lens, and a positive lens disposed and mutually united in order from the object side, and the second cemented lens has a positive refracting power as a whole.

Preferably, the zoom lens satisfies the conditional expressions of: $1.65 < n_{c1-1} < 1.90$, $1.65 < n_{c1-2} < 1.90$, $4 < v_{c1-1} - v_{c1-2} < 25$, and $68 < v_{c1-3} < 98$, wherein $n_{c1-1}$ is a refractive index of the positive lens on the object side of the first cemented lens, $n_{c1-2}$ is a refractive index of the negative lens of the first cemented lens, $v_{c1-1}$ is an Abbe number of the positive lens on the object side of the first cemented lens, $v_{c1-2}$ is an Abbe number of the negative lens of the first cemented lens, and $v_{c1-3}$ is an Abbe number of the positive lens on the image side of the first cemented lens.

Preferably, the zoom lens satisfies the conditional expression of: $0.10 < d_{c1-2}/d_{c1-all} < 0.19$, wherein $d_{c1-2}$ is a central thickness of the negative lens, which is a thickness measured along an optical axis of a lens, of the first cemented lens, and $d_{c1-all}$ is a central thickness of all the lenses of the first cemented lens.

Preferably, the zoom lens satisfies the conditional expressions of: $0.2 < (R_{c1-1} - R_{c1-3})/(R_{c1-1} + R_{c1-3}) < 0.5$, and $-0.4 < (R_{c1-3} - R_{c1-4})/(R_{c1-3} + R_{c1-4}) < -0.1$, wherein $R_{c1-1}$ is a curvature radius of a surface on the most object side of the first cemented lens, $R_{c1-3}$ is a curvature radius of a united surface on the image side of two united surfaces of the first cemented lens, and $R_{c1-4}$ is a curvature radius of a surface on the most image side of the first cemented lens.

Preferably, the second cemented lens is disposed on an image side of the first cemented lens, and the second cemented lens has two pieces of a negative lens and a positive lens disposed and mutually united in order from the object side, and the zoom lens satisfies the conditional expression of: $68 < v_{c2-2} < 98$, wherein $v_{c2-2}$ is an Abbe number of the positive lens of the second cemented lens.

Preferably, the second cemented lens is disposed on an image side of the first cemented lens, and at least one piece of positive lens is disposed on the object side of the first cemented lens.

Preferably, at least one piece of the positive lens disposed on the object side of the first cemented lens has at least one aspherical surface.

Preferably, the first cemented lens is configured only with spherical surfaces and the second lens group includes at least one aspherical surface.

BRIEF DESCRIPTION OF THE DRAWINGS

FIG. 7 is an aberration curve showing the spherical aberration, astigmatism, distortion, and coma aberration at the medium focal length, of the zoom lens relating to the embodiment 1 illustrated in FIG. 1;

FIG. 8 is an aberration curve showing the spherical aberration, astigmatism, distortion, and coma aberration at the telephoto end, of the zoom lens relating to the embodiment 1 illustrated in FIG. 1;

DESCRIPTIONS OF THE PREFERRED EMBODIMENTS

Figure 1:
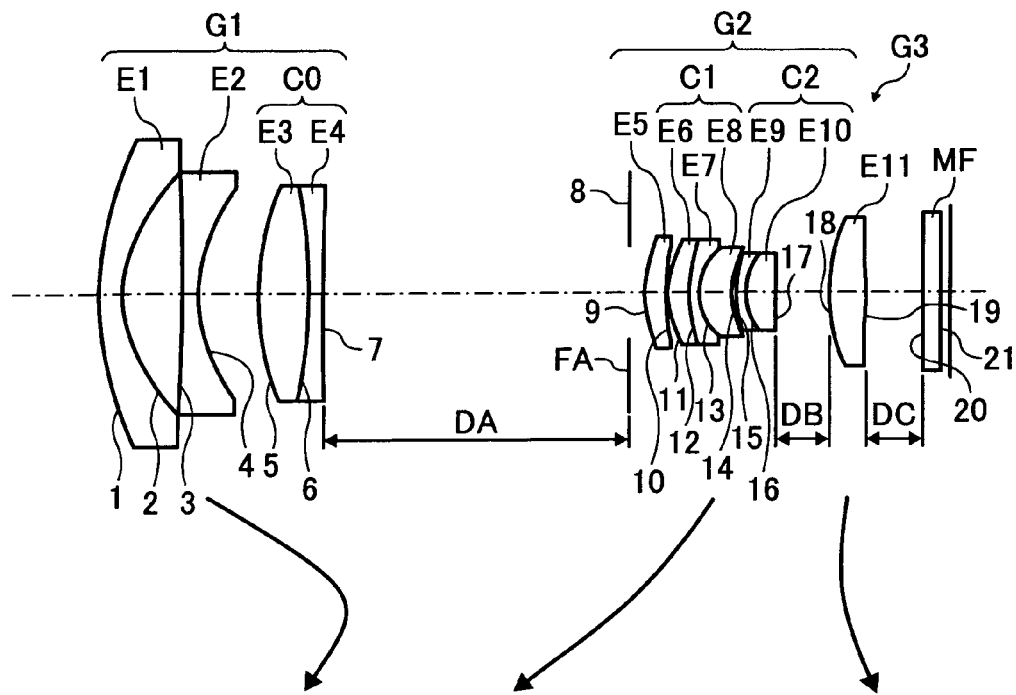
FIG. 1 is a sectional view typically illustrating the configuration of the optical system along the optical axis of the zoom lens relating to the first embodiment of the present invention.

The zoom lens, camera, and personal digital assistant relating to the invention will be described in detail based on the embodiments, with reference to the appended drawings of the invention. Before concrete embodiments being described, the configurations and the functions of the embodiment of the present invention will be described, for an understanding of the theoretical aspect of the invention.

The zoom lens according to the embodiment of the present invention has a first lens group having a negative refracting power, a second lens group having a positive refracting power, and an aperture stop; the first lens group, the aperture stop, and the second lens group are disposed in order from the object side; the aperture stop is made to move in one united body with the second lens group; and along with changing magnification from a wide-angle end toward a telephoto end, at least both the first lens group and the second lens group move in a manner that a spacing between the first lens group and the second lens group decreases gradually and a spacing between the second lens group and an image surface increases gradually. And, the zoom lenses each have the following features.

In the zoom lens relating to the embodiment of the present invention, the second lens group has a first cemented lens having at least three pieces of lenses mutually adhered and united, and a second cemented lens having at least two pieces of lenses mutually adhered and united.

The zoom lens relating to the embodiment of the present invention also has a third lens group having a positive focal length on the image side of the second lens group; along with changing magnification from the wide-angle end toward the telephoto end, at least both the first lens group and the second lens group move in a manner that the spacing between the spacing between the second lens group and the third lens group increases gradually; and the second lens group has a first cemented lens having at least three pieces of lenses united, and a second cemented lens having at least two pieces of lenses united.

The zoom lens relating to the embodiment of the present invention assumes a configuration such that, in the zoom lens according to the embodiment of the present invention, the second cemented lens is disposed on the image side of the first cemented lens; a most object side surface of the first cemented lens is convex toward the object side and a most image side surface of the first cemented lens is concave toward the object side, that is, both the surfaces are convex toward the object side; and the second cemented lens has a positive refracting power as a whole.

The zoom lens relating to the embodiment of the present invention assumes a configuration such that, in the zoom lens according to the embodiment of the present invention, the second cemented lens is disposed on the image side of the first cemented lens; the first cemented lens has three pieces of a positive lens, a negative lens, and a positive lens disposed and mutually united in order from the object side; and the second cemented lens has a positive refracting power as a whole.

The zoom lens relating to the embodiment of the present invention satisfies the conditional expressions of:

$1.65 < n_{c1-1} < 1.90$, $1.65 < n_{c1-2} < 1.90$, $4 < v_{c1-1} - v_{c1-2} < 25$, and $68 < v_{c1-3} < 98$, wherein $n_{c1-1}$ is a refractive index of the positive lens on the object side of the first cemented lens, $n_{c1-2}$ is a refractive index of the negative lens of the first cemented lens, $v_{c1-1}$ is an Abbe number of the positive lens on the object side of the first cemented lens, $v_{c1-2}$ is an Abbe number of the negative lens of the first cemented lens, and $v_{c1-3}$ is an Abbe number of the positive lens on the image side of the first cemented lens.

The zoom lens relating to the embodiment of the present invention satisfies the conditional expression of: $0.10 < d_{c1-2}/d_{c1-all} < 0.19$, wherein $d_{c1-2}$ is a central thickness (thickness measured along the optical axis) of the negative lens of the first cemented lens, and $d_{c1-all}$ is a central thickness of all the lenses of the first cemented lens.

The zoom lens relating to the embodiment of the present invention satisfies the conditional expressions of:

$0.2 < (R_{c1-1} - R_{c1-3})/(R_{c1-1} + R_{c1-3}) < 0.5$, and $-0.4 < (R_{c1-3} - R_{c1-4})/(R_{c1-3} + R_{c1-4}) < -0.1$, wherein $R_{c1-1}$ is a curvature radius of a surface on the most object side of the first cemented lens, $R_{c1-3}$ is a curvature radius of a united surface on the image side of two united surfaces of the first cemented lens, and $R_{c1-4}$ is a curvature radius of a surface on the most image side of the first cemented lens.

The zoom lens relating to the embodiment of the present invention assumes a configuration such that the second cemented lens is disposed on the image side of the first cemented lens, and the second cemented lens has two pieces of a negative lens and a positive lens disposed and mutually united in order from the object side; and the zoom lens satisfies the conditional expression of:

$68 < v_{c2-2} < 98$, wherein $v_{c2-2}$ is an Abbe number of the positive lens of the second cemented lens.

The zoom lens relating to the embodiment of the present invention assumes a configuration such that the second cemented lens is disposed on the image side of the first cemented lens, and at least one piece of positive lens is disposed on the object side of the first cemented lens.

The zoom lens relating to the embodiment of the present invention assumes a configuration such that at least one piece of the positive lens disposed on the object side of the first cemented lens in the second cemented lens has at least one aspherical surface.

The zoom lens relating to the embodiment of the present invention assumes a configuration such that the first cemented lens is made up only with spherical surfaces and the second lens group includes at least one aspherical surface.

The camera relating to the embodiment of the present invention has a zoom lens according to the embodiment of the present invention, as a photographing optical system.

The personal digital assistant relating to the embodiment of the present invention has a zoom lens according to the embodiment of the present invention, as a photographing optical system of a camera functional part.

Next, the embodiment of the present invention and the functions thereof will be described in detail.

Like the zoom lens relating to the invention, in the zoom lens by a two group configuration wherein the first lens group having a negative refracting power and the second lens group having a positive refracting power are disposed negative, positive in order from the object side, generally, the second lens group moves monotonously from the image side toward the object side along with changing magnification from the wide-angle end to the telephoto end, and the first lens group moves so as to correct the fluctuations of image surface positions generated along with changing magnification. It is possible to add the third lens group having a positive refracting power in order for placing the eye point distantly from the image surface, or for a rear focusing. In that case, the second lens group plays the major part of changing magnification.

In order to realize a zoom lens having low aberrations and a high resolving power, it is necessary to reduce the aberration fluctuations due to changing magnification; and it is especially necessary that the aberration correction in the second lens group as the major changing magnification group is satisfactorily completed over the whole range of the changing magnification. Especially, to realize a wider angle of view at the short focal end, namely, at the wide-angle end, it is necessary to reduce the power chromatic aberration that increases along with the angle of view becoming wide. To satisfactorily correct this over the whole range of the changing magnification, the configuration of the second lens group is still important.

As the configuration of the second lens group, there are a three-piece configuration of a positive lens/negative lens/positive lens disposed in order from the object side, a three-piece configuration of a positive lens/positive lens/negative lens, a four-piece configuration of a positive lens/positive lens/negative lens/positive lens, and a four-piece configuration of a positive lens/negative lens/negative lens/positive lens, and so forth. And, a configuration including two pairs of cemented lenses and a configuration including three cemented lenses are also known.

The present invention relates to the configuration of the second lens group having the capability of correcting aberrations that excels the conventionally existing or well-known configurations; and the invention intends to realize a zoom lens to give a higher performance with a smaller size and a wider angle of view, while repressing an increase in costs.

Concretely, in the present invention, the second lens group is configured to have the first cemented lens having at least three lenses united and the second cemented lens having at least two lenses united. This is based on the following reason.

First of all, the three united surfaces each in the second lens group have different distances from the aperture stop, and the axial rays and off-axis rays have different paths. Now, if only the chromatic aberration is to be corrected, to have two united surfaces will make it possible to correct the axial chromatic aberration and the power chromatic aberration somewhat independently, thus leads to securing a sufficient performance. However, if the correction of the off-axis monochromatic aberration (coma aberration, astigmatism) along with the chromatic aberration is taken into consideration, the curvature of at least one of the two united surfaces becomes necessary to be controlled, from the limitations of the monochromatic aberration correction; therefore, the two united surfaces cannot be used only for the chromatic aberration correction. Accordingly, providing one more united surface secures the degree of freedom that can be used for the chromatic aberration correction, so that the monochromatic aberration correction becomes consistent with the chromatic aberration correction at a higher level.

Now, for providing the second lens group with three united surfaces, it is conceivable to use three pairs of cemented lenses. However, three pairs of cemented lenses need six pieces of lenses, which is disadvantageous in view of seeking a smaller size. Also in order to repress a deterioration of image-forming performance due to the decentering among the lenses generated during assembling, two of the three united surfaces are desirably configured as a three-piece cemented lens. If the downsizing and the reduction of the decentering simply take precedence over all others, it will be conceivable to adopt a four-piece cemented lens having three united surfaces. However, such a configuration will take the degree of freedom for correcting the monochromatic aberration to a large extent. Therefore, the inventors of this patent application considered that the method of providing three united surfaces by means of a three-piece cemented lens and a two-piece cemented lens is most balanced and excellent. In order to repress blurred colors on the image periphery, it is important to satisfactorily correct the power chromatic aberration as well as the chromatic coma aberration, that is, the difference of shape of the coma aberration by the wavelength. Therefore, it displays a great effect that the method of the invention is capable of securing the degree of freedom for correcting the chromatic aberration more than the conventional.

The above configuration of the second lens group is effective, especially, in case the half angle of view at the wide-angle end exceeds 40 degrees; by this configuration, it will be possible to extremely satisfactorily correct the chromatic aberration, especially, the power chromatic aberration and coma aberration, while sufficiently repressing the generation of off-axis monochromatic aberration that increases along with the angle of view becoming wide. Thereby, a sufficiently wide angle of view can be attained without using a special low dispersive glass to the first lens group of which lens diameter is large, for example, and it becomes possible to repress the increase in costs as a whole.

Naturally desirable is the three group configuration of negative/positive/positive, wherein a positive third lens group is added. To add the third lens group having a positive refracting power will not only make it easy to secure the eye-point height, but also make it possible to gain a focusing by the movement of the third lens group.

In addition to the chromatic aberration correction, in order to satisfactorily correct the monochromatic aberration such as the spherical aberration and astigmatism, it is preferable that the second cemented lens is disposed on the image side of the first cemented lens, both of the most object side surface of the first cemented lens and the most image side surface of the first cemented lens are convex toward the object side, and the second cemented lens has a positive refracting power as a whole.

Making the first cemented lens into a meniscus shape facing the convex surface toward the object side as a whole will generate mutually reversedly directional aberrations on a plane of incidence and a plane of exit, whereby a satisfactory aberration correction as a whole is brought about. And, to dispose the second cemented lens having the positive refracting power as a whole on the image side of the first cemented lens will make it easy that the second lens group takes the symmetrical power configuration of positive/negative/positive, wherein the negative refracting power that the most image side surface of the first cemented lens has is set on the center. Thereby, the chromatic aberration correction becomes consistent with the field curvature correction at a higher level.

The first cemented lens may have three pieces of a positive lens, a negative lens, and a positive lens disposed and mutually united in order from the object side.

In case of correcting both the axial chromatic aberration and the power chromatic aberration by using only one set of cemented lens to the second lens group, a three-piece cemented lens having a negative lens/positive lens/negative lens united in this order is appropriate. However, in case of using two set of cemented lenses as the present invention, the first cemented lens and the second cemented lens can share the function of correcting the axial chromatic aberration and the power chromatic aberration; and the former case is not relevant to this case. To make the first cemented lens into a general triplet power configuration of a positive/negative/positive and dispose the second cemented lens having the positive refracting power as a whole on the image side thereof will make it possible to divide the positive power being distant from the aperture stop, which greatly contributes to the off-axis aberration; thereby, the degree of freedom of the aberration correction becomes increased, which is advantageous to seeking a wider angle of view.

When the first cemented lens is configured with three pieces of a positive lens, a negative lens, and a positive lens disposed and mutually united in order from the object side, in order to attain a satisfactory aberration correction, the lens preferably satisfies the conditional expressions of:

$1.65 < n_{c1\text{-}1} < 1.90$, $1.65 < n_{c1\text{-}2} < 1.90$, $4 < v_{c1\text{-}1} - v_{c1\text{-}2} < 25$, and $68 < v_{c1\text{-}3} < 98$, wherein $n_{c1\text{-}1}$ is a refractive index of the positive lens on the object side of the first cemented lens, $n_{c1\text{-}2}$ is a refractive index of the negative lens of the first cemented lens, $v_{c1\text{-}1}$ is an Abbe number of the positive lens on the object side of the first cemented lens, $v_{c1\text{-}2}$ is an Abbe number of the negative lens of the first cemented lens, and $v_{c1\text{-}3}$ is an Abbe number of the positive lens on the image side of the first cemented lens.

To be more specific, preferably, both $n_{c1\text{-}1}$ and $n_{c1\text{-}2}$ exceed 1.65 and fall below 1.90. If $n_{c1\text{-}1}$ or $n_{c1\text{-}2}$ is below 1.65, the curvature of a surface for acquiring the refracting power required for the aberration correction will become large, and an excessively high order aberration will generate; this is not desirable. If $n_{c1\text{-}1}$ or $n_{c1\text{-}2}$ is 1.90 or more, selectable glass type will be limited, and a balanced chromatic aberration becomes difficult to gain. In regard to the balanced chromatic aberration, it is desirable that $v_{c1\text{-}1} - v_{c1\text{-}2}$ is within a predetermined range, that is, that $v_{c1\text{-}1} - v_{c1\text{-}2}$ exceeds 4 and falls below 25. If $v_{c1-1} - v_{c1-2}$ is 4 or less, it will become difficult to exhibit the effect of chromatic aberration correction by the united surface on the object side. If $v_{c1-1} - v_{c1-2}$ is 25 or more, it will become difficult to gain a balanced axial chromatic aberration and power chromatic aberration. Further, $v_{c1-3}$ is desirably over 68 and below 98. If $v_{c1-3}$ is 68 or less, the correction of a second order spectrum of the chromatic aberration is likely to become insufficient. If $v_{c1-3}$ is 98 or more, it will be difficult to procure such species, or such species will become extremely expensive, which is not practical.

In regard to the first cemented lens configured with three pieces of a positive lens, a negative lens, and a positive lens disposed and mutually united in order from the object side, for securing both the downsizing and the processability, it is desirable to satisfy the conditional expression of:

$$0.10 < d_{c1-2}/d_{c1-all} < 0.19,$$

wherein $d_{c1-2}$ is a central thickness (thickness measured along the optical axis) of the negative lens of the first cemented lens, and $d_{c1-all}$ is a central thickness of all the lenses of the first cemented lens.

In other words, $d_{c1-2}/d_{c1-all}$ is desirably over 0.1 and below 0.19. If $d_{c1-2}/d_{c1-all}$ is 0.10 or less, the central thickness of the negative lens will be too thin, and this makes the processing difficult. If $d_{c1-2}/d_{c1-all}$ is 0.19 or more, the thickness of periphery of the positive lens will be too thin, and this makes the processing difficult. In any cases, to increase the central thickness of all the lenses of the cemented lens will make the processing possible outside the range of the conditional expression; however, this is a hindrance to downsizing, which is not desirable.

In regard to the first cemented lens configured with three pieces of a positive lens, a negative lens, and a positive lens disposed and mutually united in order from the object side, for satisfactorily correcting both the monochromatic aberration and the chromatic aberration, it is desirable to satisfy the conditional expressions of:

$$0.2 < (R_{c1-1} - R_{c1-3})/(R_{c1-1} + R_{c1-3}) < 0.5, \text{ and}$$

$$-0.4 < (R_{c1-3} - R_{c1-4})/(R_{c1-3} + R_{c1-4}) < -0.1$$

wherein $R_{c1-1}$ is a curvature radius of a surface on the most object side of the first cemented lens, $R_{c1-3}$ is a curvature radius of a united surface on the image side of two united surfaces of the first cemented lens, and $R_{c1-4}$ is a curvature radius of a surface on the most image side of the first cemented lens.

In other words, $(R_{c1-1} - R_{c1-3})/(R_{c1-1} + R_{c1-3})$ is desirably over 0.2 and below 0.5, $(R_{c1-3} - R_{c1-4})/(R_{c1-3} + R_{c1-4})$ is desirably over −0.4 and below −0.1. If $(R_{c1-1} - R_{c1-3})/(R_{c1-1} + R_{c1-3})$ is 0.2 or less, or if $(R_{c1-3} - R_{c1-4})/(R_{c1-3} + R_{c1-4})$ is −0.1 or more, the refracting power of each lens inside the first cemented lens will become too strong, and this generates excessively high-order aberrations, and makes it difficult to gain a balanced aberration.

If $(R_{c1-1} - R_{c1-3})/(R_{c1-1} + R_{c1-3})$ is 0.5 or more, or if $R_{c1-3} - R_{c1-4})/(R_{c1-3} + R_{c1-4})$ is −0.4 or less, the refracting power of each lens inside the first cemented lens will become too weak, and both the monochromatic aberration correction and the chromatic aberration correction easily become insufficient.

In the zoom lens of the present invention, in order to satisfactorily correct the power chromatic aberration, it is desirable that the second cemented lens is disposed on the image side of the first cemented lens, and the second cemented lens has two pieces of a negative lens and a positive lens disposed and mutually united in order from the object side, and the zoom lenses satisfies the conditional expression of:

$$68 < v_{c2-2} < 98,$$

wherein $v_{c2-2}$ is an Abbe number of the positive lens of the second cemented lens.

The second cemented lens disposed on the image side of the cemented lens is distant from the aperture stop, and makes a large contribution to the off-axis aberration. In this case, the second cemented lens plays an important role in correcting the power chromatic aberration, and by adopting the above configuration, the effect will be displayed at the maximum level. In concrete, $v_{c2-2}$ is desirably over 68 and below 98. If $v_{c2-2}$ is 68 or less, the correction of the second order spectrum of the chromatic aberration is likely to become insufficient. On the other hand, the glass type having $v_{c2-2}$ 98 or more is difficult to be procured, or it is extremely expensive, which is not practical.

The positive lens of the second cemented lens can be configured not only with a low dispersive glass, but also with a special low dispersive glass, since the lens has a relatively small diameter. Therefore, it is possible to configure the lens with a special low dispersive glass and achieve a satisfactory aberration correction.

In the zoom lens of the present invention, in order to satisfactorily correct the chromatic aberrations, it is desirable that the second cemented lens is disposed on the image side of the first cemented lens, and at least one piece of positive lens is disposed on the object side of the first cemented lens. In other words, the second lens group assumes a configuration such that the positive lens, the first cemented lens, and the second cemented lens are disposed in order from the object side. And, in order to satisfactorily correct the spherical aberration and coma aberration, it is desirable to apply at least one aspherical surface to at least one piece of the positive lens disposed on the object side of the first cemented lens.

Further, in the second lens group, it is desirable that the first cemented lens is configured only with spherical surfaces and the other lenses except the second cemented lens include at least one aspherical surface. Since the above first cemented lens is configured with at least three pieces of lenses united, the control of decentering during the lenses being united becomes complicated. If an aspherical surface is provided to the first cemented lens, it will easily generate a deterioration of the image-forming performance by the influence of decentering during the lenses being united.

The second lens group of the zoom lens relating to the present invention may be configured with a positive lens, the first cemented lens, and the second cemented lens, disposed in order from the object side. Here, the first cemented lens is configured with three pieces of lens facing a convex surface toward the object side, a negative lens facing a concave surface toward the image side, and a positive meniscus lens facing a convex surface toward the object side, which are disposed and mutually united in order from the object side; and the second cemented lens is configured with two pieces of a negative meniscus lens facing a concave surface toward the image side and a positive lens disposed and mutually united in order from the object side. Such a three-group configuration with six pieces assumes the disposition of positive, positive, negative, positive, negative, and positive as a whole; thereby, the disposition of the refracting power becomes nearly symmetrical, which leads to a well-balanced aberration correction.

For a further satisfactory aberration correction, it is effective to use plural aspherical surfaces to the second lens group. Here, it is desirable to use two aspherical surfaces to a lens on the most object side and a lens on the most image side. The lens on the most object side is near the aperture stop, which effects a significant correction of the spherical aberration and coma aberration. The lens on the most image side is distant from the aperture stop and off-axis luminous fluxes pass separately to some extent; thereby, in addition to the spherical aberration and coma aberration, it is also effective to the correction of astigmatic aberration.

The above configuration of the second lens gives sufficient features to the zoom lens relating to the present invention; and additional remarks will be made on the conditions for securing a further satisfactory performance as the zoom lens. The first lens group is desirably configured with three pieces of a negative meniscus lens facing a concave surface toward the image side, a negative lens, and a positive lens in order from the object side, or with four pieces by three groups of a negative meniscus lens facing a concave surface toward the image side, a negative lens, and a cemented lens of a positive lens and a negative lens in order from the object side. Since the two pieces of the negative lenses are disposed on the object side of the first lens group, the four surfaces of the two negative lenses will gradually refract the off-axis luminous fluxes that have significant incident angles, and it becomes possible to repress a generation of off-axis aberration lower.

For a further satisfactory correction of the monochromatic aberration, it is desirable to provide the first lens group with one or more aspherical surfaces.

Especially desirable is to give an aspherical surface to the image side surface of either one of two pieces of the negative lenses disposed on the object side. Introducing an aspherical surface to this place will make it possible to effectively correct the distortion and astigmatism and so forth, especially at the short focal end.

The third lens group is made of a positive lens facing a surface of large curvature toward the object side, and it desirably has at least one aspherical surface.

Such a configuration will further satisfactorily correct the off-axis aberration such as astigmatism, while repressing the thickness of the third lens group at the minimum. In case of configuring the third lens group with one piece of positive lens, to use a nitrate having as low dispersiveness as possible is desirable in view of the chromatic aberration correction.

The third lens group may be fixed during changing magnification; however, a little movement will increase the degree of freedom of the aberration correction.

It is desirable to make the open diameter of the aperture stop constant regardless of changing magnification, because of simplicity of the mechanism. However, by making the open diameter larger at the long focal end, namely, the telephoto end than at the short focal end, namely, the wide-angle end, it is possible to decrease the variations of F numbers (F values) along with changing magnification. When a decrease of the quantity of light reaching to the image surface is required, the aperture stop may be made smaller; however, it is preferable to decrease the quantity of light by inserting an ND (neutral density) filter, for example, since it will prevent a lowering of the resolving power by the diffraction phenomenon.

As an aspherical lens, the following can be used: lenses molded out of an optical glass and optical plastic (glass mold aspherical lens, plastic mold aspherical lens), and a lens wherein a thin resin layer is formed on the plane of a glass lens, and the surface of the resin layer is made aspherical (referred to as a hybrid aspherical lens, or a replica aspherical lens), and so forth.

To configure a camera with the above mentioned zoom lens as a photographing optical system will realize a higher image quality by the high resolving power with a smaller size, owing to the zoom lens capable of achieving a sufficiently wide half angle of view of 42 degrees or more at the wide-angle end, satisfactorily correcting the chromatic aberration, especially, the power chromatic aberration and coma aberration, and achieving a resolving power corresponding to an imaging device having 8 to 10 million pixels or more with a smaller size.

To configure a personal digital assistant with the above mentioned zoom lens as a photographing optical system of the camera functional part will realize a higher image quality by the high resolving power with a smaller size, owing to the zoom lens capable of achieving a sufficiently wide half angle of view of 42 degrees or more at the wide-angle end, satisfactorily correcting the chromatic aberration, especially, the power chromatic aberration and coma aberration, and achieving a resolving power corresponding to an imaging device having 8 to 10 million pixels or more with a smaller size.

Embodiment 1

Next, based on the embodiment of the above mentioned invention, concrete examples will be described in detail. As mentioned below, the embodiment 1, embodiment 2, embodiment 3, embodiment 4, and embodiment 5 are examples of concrete configurations based on concrete value examples of the zoom lens relating to the present invention. Here, the embodiment of a camera or a personal digital assistant relating to the present invention will be described later, which uses a lens unit made up with the zoom lens as described in the embodiment 1 trough the embodiment 5 as the photographing optical system.

The embodiment 1 through the embodiment 5 of the zoom lens relating to the present invention shows the concrete configurations of the zoom lens and the concrete value examples thereof. Here, in the embodiment 1 through the embodiment 5, the maximum image height is 4.70 mm.

An optical element made of a plane parallel plate disposed on the image surface side of the third lens group in the embodiment 1 through the embodiment 4, or disposed on the image surface side of the second lens group in the embodiment 5 is assumedly an optical filter such as an optical low-pass filter and infrared cut filter, and a cover glass (shield glass) of a light receiving element such as a CCD sensor; here, this is referred to as a various type filter.

In the embodiment 1 through the embodiment 5, the image side surface of a lens on the most object side of the first lens group and both the most object side surface and the most image side surface of the second lens group are aspherical; and in the embodiment 1 through the embodiment 4, the most image side surface of the third lens group is aspherical. Here, in regard to the aspherical surface in the embodiment 1 through the embodiment 5, the description assumes that each lens surface is directly formed into an aspherical shape, like the so-called molded aspherical lens. However, the aspherical lens may be the so-called hybrid aspherical lens, wherein a thin resin layer having an aspherical surface formed is overlaid on the lens surface of a spherical lens to acquire an equivalent aspherical surface.

The aberration in the embodiment 1 through the embodiment 5 is sufficiently corrected, and the zoom lens can be associated with a light receiving element having 8 to 10 million pixels or more. Configuring a zoom lens according to the present invention makes it possible to secure extremely satisfactory image performances while achieving a sufficiently small size, which becomes clear from the embodiment 1 through the embodiment 5.

The symbols and the meanings thereof in the embodiment 1 through the embodiment 5 are as follows.

f: focal length of the whole system
F: F number
ω: half angle of view
R: curvature radius
D: inter-facial spacing
$N_d$: refractive index $V_d$: Abbe number
K: conic constant of an aspherical surface
$A_4$: fourth order aspherical coefficient
$A_6$: sixth order aspherical coefficient
$A_8$: eighth order aspherical coefficient
$A_{10}$: tenth order aspherical coefficient
$A_{12}$: twelfth order aspherical coefficient
$A_{14}$: fourteenth order aspherical coefficient
$A_{16}$: sixteenth order aspherical coefficient
$A_{18}$: eighteenth order aspherical coefficient The aspherical surface used herein is given by the following formula.

[Formula 1]

$$X = \frac{CH^2}{1 + \sqrt{1 - (1+K)C^2H^2}} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18} \quad (1)$$

Here, C is the inverse number of paraxial curvature radius (paraxial curvature), H is the height from the optical axis, and $A_4, A_6, A_8, \ldots$ are the aspherical coefficients.

FIG. 1 illustrates a configuration of an optical system of the zoom lens relating to the embodiment 1, in which the arrows typically illustrate a schematic movement locus of each lens group along with the zooming from the short focal end, namely, the wide-angle end to the long focal end, namely, the telephoto end through the medium focal length.

The zoom lens illustrated in FIG. 1 includes a first lens E1, second lens E2, third lens E3, fourth lens E4, fifth lens E5, sixth lens E6, seventh lens E7, eighth lens E8, ninth lens E9, tenth lens E10, eleventh lens E11, aperture stop FA, and various type filter MF. In this case, the first lens E1 through the fourth lens E4 constitute the first lens group G1, the fifth lens E5 through the tenth lens E10 constitute the second lens group G2, and the eleventh lens E11 alone constitutes the third lens group G3; and each lens group is supported by an appropriately common supporting frame, for example.

In the zooming operation, each lens group moves in one united body as a unit of each lens group, and the aperture stop FA moves in one united body with the second lens group G2. FIG. 1 also illustrates the surface number of each optical surface. Here, the reference symbols given to FIG. 1 are used independently from the other embodiments to avoid confusions of description by the increase of digits in the reference symbols; in other words, each embodiment uses independent reference symbols. Therefore, the reference symbols common to those given to FIG. 2 through FIG. 5 do not necessarily represent components common to the other embodiments.

In FIG. 1, the optical components constituting the optical system of the zoom lens are disposed in order from the object side of a subject, for example, the first lens E1, second lens E2, third lens E3, fourth lens E4, and aperture stop FA, fifth lens E5, sixth lens E6, seventh lens E7, eighth lens E8, ninth lens E9, tenth lens E10, eleventh lens E11, and various type filter MF. The image is formed on the back of the various type filter MF.

The first lens E1 is a negative meniscus lens formed convexly toward the object side, which has an aspherical surface on the image side. The second lens E2 is a negative lens, both surfaces of which are concave. The third lens E3 is a positive lens, both surfaces of which are convex. The fourth lens E4 is a negative lens, both surfaces of which are concave. Two pieces of the third lens E3 and the fourth lens E4 are adhered and applied to each other to be united in one body, which form a cemented lens C0. The first lens group G1 configured with the first lens E1 through the fourth lens E4 has a negative refracting power as a whole.

The fifth lens E5 is a positive meniscus lens formed convexly toward the object side, which has an aspherical surface on the object side. The sixth lens E6 is a positive meniscus lens formed convexly toward the object side. The seventh lens E7 is a negative meniscus lens formed convexly toward the object side. The eighth lens E8 is a positive meniscus lens formed convexly toward the object side. Three pieces of the sixth lens E6 through the eighth lens E8 are adhered and applied to each other to be united in one body, which form a first cemented lens C1. The ninth lens E9 is a negative meniscus lens formed convexly toward the object side. The tenth lens E10 is a positive lens having an aspherical surface on the image side, both surfaces of which are convex. Two pieces of the ninth lens E9 and the tenth lens E10 are adhered and applied to each other to be united in one body, which form a second cemented lens C2. The second lens group G2 configured with the fifth lens E5 through the tenth lens E10 has a positive refracting power as a whole.

The eleventh lens E11 is a positive lens having an aspherical surface on the image side, both surfaces of which are convex. The third lens group G3 configured only with the eleventh lens E11 has naturally a positive refracting power.

In the changing magnification between the short focal end, namely, the wide-angle end and the long focal end, namely, the telephoto end, variable spacings between the lens groups vary, that is, a spacing DA between the most image side surface of the first lens group G1, namely, the image side surface of the fourth lens E4 (surface number 7) and the surface of the aperture stop FA (surface number 8) positioned on the object side of the second lens group G2, which moves in one body with the second lens group G2, a spacing DB between the most image side surface of the second lens group G2, namely, the image side surface of the tenth lens E10 (surface number 17) and the most object side surface of the third lens group G3, namely, the object side surface of the eleventh lens E11 (surface number 18), and a spacing DC between the most image side surface of the third lens group G3, namely, the image side surface of the eleventh lens E11 (surface number 19) and the object side surface of the various type filter MF (surface number 20) vary. And, along with the changing magnification from the wide-angle end toward the telephoto end, the first lens group G1, the second lens group G2, and the third lens group G3 move, in a manner that the spacing DA between the first lens group G1 and the aperture stop FA (moving in one body with the second lens group G2) gradually decreases, the spacing DB between the second lens group G2 and the third lens group G3 gradually increases, and the spacing DC between the third lens group G3 and the various type filter MF increases briefly, and then decreases. In the movement along with the changing magnification from the wide-angle end toward the telephoto end, the second lens group G2 moves almost monotonously toward the object side, the first lens group G1 moves toward the image side briefly, and then moves toward the object side, and the third lens group G3 moves toward the object side briefly, and then moves toward the image side.

In the embodiment 1, the focal length of the whole system f, the F number F, and the half angle of view c vary in the following ranges with the zooming: f=5.204–14.996, F=2.66–4.67, ω=43.26–17.51. The optical characteristics of the optical components are given in the following table.

TABLE 1 optical characteristics

| surface number | R | D | $N_d$ | $v_d$ | remarks | name of glass type |
|---|---|---|---|---|---|---|
| 01 | 24.422 | 1.60 | 1.73310 | 48.89 | E1 | OHARA L-LAM72 |
| 02* | 9.225 | 4.11 | | | | |
| 03 | −180.153 | 1.20 | 1.77250 | 49.60 | E2 | OHARA S-LAH66 |
| 04 | 11.584 | 4.10 | | | | |
| 05 | 20.498 | 3.55 | 1.80100 | 34.97 | E3 | OHARA S-LAM66 |
| 06 | −34.360 | 1.00 | 1.75700 | 47.82 | E4 | OHARA S-LAM54 |
| 07 | 232.236 | (DA) variable | | | | |
| 08 | aperture stop | 1.00 | | | FA | |
| 09* | 8.821 | 1.56 | 1.77250 | 49.60 | E5 | OHARA S-LAH66 |
| 10 | 22.899 | 0.10 | | | | |
| 11 | 7.072 | 1.45 | 1.80440 | 39.59 | E6 | OHARA S-LAH63 |
| 12 | 11.355 | 0.70 | 1.80100 | 34.97 | E7 | OHARA S-LAM66 |
| 13 | 3.897 | 2.25 | 1.48749 | 70.24 | E8 | OHARA S-FSL5 |
| 14 | 6.572 | 0.33 | | | | |
| 15 | 11.142 | 0.60 | 1.74950 | 35.28 | E9 | OHARA S-LAM7 |
| 16 | 4.205 | 2.13 | 1.49700 | 81.54 | E10 | OHARA S-FPL51 |
| 17* | −100.000 | (DB) variable | | | | |
| 18 | 12.952 | 2.50 | 1.43875 | 94.94 | E11 | OHARA S-FPL53 |
| 19* | −153.191 | (DC) variable | | | | |
| 20 | ∞ | 1.24 | 1.51680 | 64.20 | | MF |
| 21 | ∞ | | | | | |

The optical surfaces of the second surface, ninth surface, seventeenth surface, and nineteenth surface wherein the asterisk mark * is applied to the surface number in Table 1 are aspherical, and the parameters of the aspherical surfaces in the formula (1) are as follows.

Aspherical surface: the second surface
K=0.0,
$A_4 = -1.28414 \times 10^{-4}$,
$A_6 = -6.57446 \times 10^{-7}$,
$A_8 = -6.30308 \times 10^{-9}$,
$A_{10} = -1.72874 \times 10^{-10}$,
$A_{12} = -2.57252 \times 10^{-12}$,
$A_{14} = 2.13910 \times 10^{-14}$,
$A_{16} = 7.39915 \times 10^{-16}$,
$A_{18} = -1.13603 \times 10^{-17}$ Aspherical surface: the ninth surface
K=0.0,
$A_4 = -7.05273 \times 10^{-5}$,
$A_6 = 5.04003 \times 10^{-7}$,
$A_8 = -6.78678 \times 10^{-8}$,
$A_{10} = 1.47308 \times 10^{-9}$ Aspherical surface: the seventeenth surface
K=0.0,
$A_4 = 4.43634 \times 10^{-5}$,
$A_6 = 1.20686 \times 10^{-5}$,
$A_8 = -4.69301 \times 10^{-6}$,
$A_{10} = 1.28473 \times 10^{-7}$ Aspherical surface: the nineteenth surface
K=0.0,
$A_4 = 6.54212 \times 10^{-5}$,
$A_6 = -8.10291 \times 10^{-6}$,
$A_8 = 1.98320 \times 10^{-9}$,
$A_{10} = -2.19065 \times 10^{-9}$ The variable spacing DA between the first lens group G1 and the aperture stop FA (the second lens group G2), the variable spacing DB between the second lens group G2 and the third lens group G3, and the variable spacing DC between the third lens group G3 and the various type filter MF are made to vary along with the zooming, as the following Table.

TABLE 2 variable spacing

| | short focal end | medium focal length | long focal end |
|---|---|---|---|
| f | 5.20 | 8.83 | 15.00 |
| DA | 21.349 | 7.868 | 1.825 |
| DB | 3.669 | 7.448 | 17.837 |
| DC | 4.009 | 4.883 | 2.771 |

The values relating to the above conditional expressions in the embodiment 1 are as follows.

Values of the conditional expressions
$n_{c1-1} = 1.80440$
$n_{c1-2} = 1.80100$
$v_{c1-1} - v_{c1-2} = 4.62$
$v_{c1-3} = 70.24$
$d_{c1-2}/d_{c1-all} = 0.159$
$(R_{c1-1} - R_{c1-3})/(R_{c1-1} + R_{c1-3}) = 0.289$
$(R_{c1-3} - R_{c1-4})/(R_{c1-3} + R_{c1-4}) = -0.256$
$v_{c2-2} = 81.54$ Thus, the above values relating to the above conditional expressions in the embodiment 1 are within the ranges of the conditional expressions.

Embodiment 2

Figure 2:
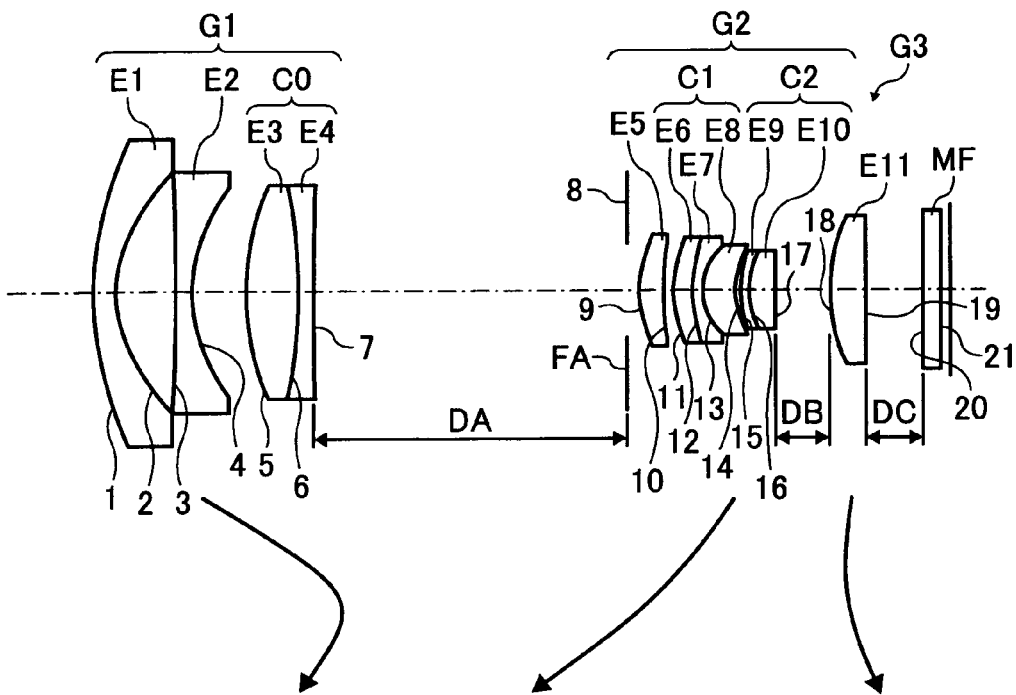
FIG. 2 is a sectional view typically illustrating the configuration of the optical system along the optical axis of the zoom lens relating to the second embodiment of the present invention.

FIG. 2 illustrates a configuration of an optical system of the zoom lens relating to the embodiment 2, in which the arrows typically illustrate a schematic movement locus of each lens group along with the zooming from the short focal end (wide-angle end) to the long focal end (telephoto end) through the medium focal length.

The zoom lens illustrated in FIG. 2 includes a first lens E1, second lens E2, third lens E3, fourth lens E4, fifth lens E5, sixth lens E6, seventh lens E7, eighth lens E8, ninth lens E9, tenth lens E10, eleventh lens E11, aperture stop FA, and various type filter MF. Also in this case, the first lens E1 through the fourth lens E4 constitute the first lens group G1, the fifth lens E5 through the tenth lens E10 constitute the second lens group G2, and the eleventh lens E11 alone constitutes the third lens group G3; and each lens group is supported by an appropriately common supporting frame, for example. In the zooming operation, each lens group moves in one united body as a unit of each lens group, and the aperture stop FA moves in one united body with the second lens group G2. FIG. 2 also illustrates the surface number of each optical surface. Here, the reference symbols given to FIG. 2 are used independently from the other embodiments, as mentioned above; in other words, each embodiment uses independent reference symbols. Therefore, the reference symbols common to those given to FIG. 1, FIG. 3, and FIG. 4 do not necessarily represent components common to the other embodiments.

Also in FIG. 2, the optical components constituting the optical system of the zoom lens are disposed in order from the object side, the first lens E1, second lens E2, third lens E3, fourth lens E4, and aperture stop FA, fifth lens E5, sixth lens E6, seventh lens E7, eighth lens E8, ninth lens E9, tenth lens E10, eleventh lens E11, and various type filter MF. The image is formed on the back of the various type filter MF.

The first lens E1 is a negative meniscus lens formed convexly toward the object side, which has an aspherical surface on the image side. The second lens E2 is a negative lens, both surfaces of which are concave. The third lens E3 is a positive lens, both surfaces of which are convex. The fourth lens E4 is a negative lens, both surfaces of which are concave. Two pieces of the third lens E3 and the fourth lens E4 are adhered and applied to each other to be united in one body, which form a cemented lens C0 having two pieces of lenses united. The first lens group G1 configured with the first lens E1 through the fourth lens E4 has a negative refracting power as a whole.

The fifth lens E5 is a positive meniscus lens formed convexly toward the object side, which has an aspherical surface on the object side. The sixth lens E6 is a positive meniscus lens formed convexly toward the object side. The seventh lens E7 is a negative meniscus lens formed convexly toward the object side. The eighth lens E8 is a positive meniscus lens formed convexly toward the object side. Three pieces of the sixth lens E6 through the eighth lens E8 are adhered and applied to each other to be united in one body, which form a first cemented lens C1. The ninth lens E9 is a negative meniscus lens formed convexly toward the object side. The tenth lens E10 is a positive lens having an aspherical surface on the image side, both surfaces of which are convex. Two pieces of the ninth lens E9 and the tenth lens E10 are adhered and applied to each other to be united in one body, which form a second cemented lens C2.

The second lens group G2 configured with the fifth lens E5 through the tenth lens E10 has a positive refracting power as a whole.

The eleventh lens E11 is a positive lens having an aspherical surface on the image side, both surfaces of which are convex. The third lens group G3 configured with only the eleventh lens E11 has naturally a positive refracting power.

In the changing magnification between the short focal end (wide-angle end) and the long focal end (telephoto end), variable spacings between the lens groups vary, that is, a spacing DA between the most image side surface of the first lens group G1, namely, the image side surface of the fourth lens E4 (surface number 7) and the surface of the aperture stop FA (surface number 8) positioned on the object side of the second lens group G2, which moves in one body with the second lens group G2, a spacing DB between the most image side surface of the second lens group G2, namely, the image side surface of the tenth lens E10 (surface number 17) and the most object side surface of the third lens group G3, namely, the object side surface of the eleventh lens E11 (surface number 18), and a spacing DC between the most image side surface of the third lens group G3, namely, the image side surface of the eleventh lens E11 (surface number 19) and the object side surface of the various type filter MF (surface number 20) vary. And, along with the changing magnification from the wide-angle end toward the telephoto end, the first lens group G1, the second lens group G2, and the third lens group G3 move, in a manner that the spacing DA between the first lens group G1 and the aperture stop FA (moving in one body with the second lens group G2) gradually decreases, the spacing DB between the second lens group G2 and the third lens group G3 gradually increases, and the spacing DC between the third lens group G3 and the various type filter MF increases briefly, and then decreases. In the movement along with the changing magnification from the wide-angle end toward the telephoto end, the second lens group G2 moves almost monotonously toward the object side, the first lens group G1 moves toward the image side briefly, and then moves toward the object side, and the third lens group G3 moves toward the object side briefly, and then moves toward the image side.

In the embodiment 2, the focal length of the whole system f, the F number F, and the half angle of view ω vary in the following ranges with the zooming: f=5.204–14.993, F=2.64–4.59, ω=43.27–17.51. The optical characteristics of the optical components are given in the following table.

TABLE 3 optical characteristics

| surface number | R | D | $N_d$ | $v_d$ | remarks | name of glass type |
|---|---|---|---|---|---|---|
| 01 | 23.933 | 1.60 | 1.73310 | 48.89 | E1 | OHARA L-LAM72 |
| 02* | 9.257 | 4.18 | | | | |
| 03 | −120.099 | 1.20 | 1.77250 | 49.60 | E2 | OHARA S-LAH66 |
| 04 | 11.127 | 3.62 | | | | |
| 05 | 19.306 | 3.69 | 1.80100 | 34.97 | E3 | OHARA S-LAM66 |
| 06 | −32.934 | 1.00 | 1.75700 | 47.82 | E4 | OHARA S-LAM54 |
| 07 | 336.795 | (DA) variable | | | | |
| 08 | aperture stop | 1.00 | | | | |
| 09* | 7.961 | 1.68 | 1.77250 | 49.60 | E5 | OHARA S-LAH66 |
| 10 | 27.338 | 0.65 | | | | |
| 11 | 8.555 | 1.36 | 1.74320 | 49.34 | E6 | OHARA S-LAM60 |
| 12 | 15.735 | 0.70 | 1.80100 | 34.97 | E7 | OHARA S-LAM66 |
| 13 | 4.000 | 2.19 | 1.48749 | 70.24 | E8 | OHARA S-FSL5 |
| 14 | 6.098 | 0.35 | | | | |
| 15 | 10.495 | 0.61 | 1.69895 | 30.13 | E9 | OHARA S-TIM35 |
| 16 | 6.280 | 1.84 | 1.43875 | 94.94 | E10 | OHARA S-FPL53 |
| 17* | −75.820 | (DB) variable | | | | |
| 18 | 12.809 | 2.50 | 1.43875 | 94.94 | E11 | OHARA S-FPL53 |
| 19* | −282.974 | (DC) variable | | | | |
| 20 | ∞ | 1.24 | 1.51680 | 64.20 | | MF |
| 21 | ∞ | | | | | |

The optical surfaces of the second surface, ninth surface, seventeenth surface, and nineteenth surface wherein the asterisk mark * is applied to the surface number in Table 3 are aspherical, and the parameters of the aspherical surfaces in the formula (1) are as follows.

Aspherical surface: the second surface
K=0.0,
$A_4=-1.32978\times10^{-4}$,
$A_6=-7.12156\times10^{-7}$,
$A_8=-5.44124\times10^{-9}$,
$A_{10}=-1.64121\times10^{-10}$,
$A_{12}=-3.45408\times10^{-12}$,
$A_{14}=2.29505\times10^{-14}$,
$A_{16}=9.05635\times10^{-16}$,
$A_{18}=-1.23794\times10^{-17}$ Aspherical surface: the ninth surface
K=0.0,
$A_4=1.04029\times10^{-4}$
$A_6=-2.77447\times10^{-7}$,
$A_8=-6.56948\times10^{-8}$,
$A_{10}=1.04196\times10^{-9}$ Aspherical surface: the seventeenth surface
K=0.0,
$A_4=1.48398\times10^{-4}$,
$A_6=1.72916\times10^{-5}$,
$A_8=-3.99171\times10^{-6}$
$A_{10}=1.80296\times10^{-7}$ Aspherical surface: the nineteenth surface
K=0.0,
$A_4=7.02797\times10^{-5}$,
$A_6=-7.99511\times10^{-6}$,
$A_8=1.94122\times10^{-7}$,
$A_{10}=-2.22699\times10^{-9}$ The variable spacing DA between the first lens group G1 and the aperture stop FA (the second lens group G2), the variable spacing DB between the second lens group G2 and the third lens group G3, and the variable spacing DC between the third lens group G3 and the various type filter MF are made to vary along with the zooming, as the following Table.

TABLE 4

| | variable spacing | | |
|---|---|---|---|
| | short focal end | medium focal length | long focal end |
| f | 5.20 | 8.83 | 14.99 |
| DA | 21.394 | 7.964 | 1.817 |
| DB | 3.670 | 7.459 | 17.706 |
| DC | 3.942 | 4.803 | 2.819 |

The values relating to the above conditional expressions in the embodiment 2 are as follows.

Values of the conditional expressions
$n_{c1-1}=1.77250$
$n_{c1-2}=1.80100$
$v_{c1-1}-v_{c1-2}=14.37$
$v_{c1-3}=70.24$
$d_{c1-2}/d_{c1-all}=0.165$
$(R_{c1-1}-R_{c1-3})/(R_{c1-1}+R_{c1-3})=0.363$
$(R_{c1-3}-R_{c1-4})/(R_{c1-3}+R_{c1-4})=-0.208$
$v_{c2-2}=94.94$ Thus, the above values relating to the above conditional expressions in the embodiment 2 are within the ranges of the conditional expressions.

Embodiment 3

Figure 3:
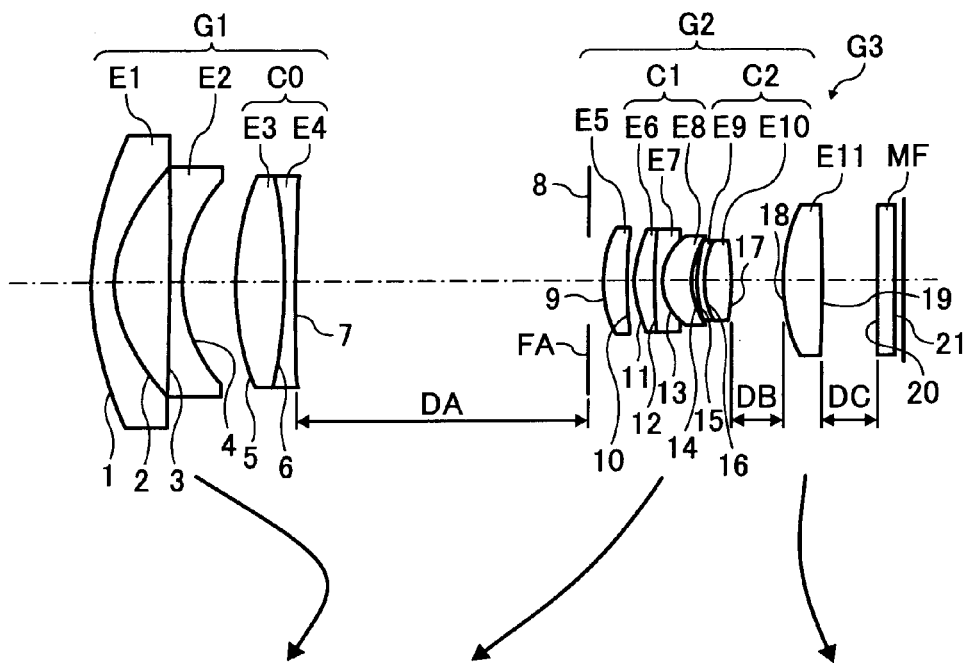
FIG. 3 is a sectional view typically illustrating the configuration of the optical system along the optical axis of the zoom lens relating to the third embodiment of the present invention.

FIG. 3 illustrates a configuration of an optical system of the zoom lens relating to the embodiment 3, in which the arrows typically illustrate a schematic movement locus of each lens group along with the zooming from the short focal end (wide-angle end) to the long focal end (telephoto end) through the medium focal length.

The zoom lens illustrated in FIG. 3 includes a first lens E1, second lens E2, third lens E3, fourth lens E4, fifth lens E5, sixth lens E6, seventh lens E7, eighth lens E8, ninth lens E9, tenth lens E10, eleventh lens E11, aperture stop FA, and various type filter MF. Also in this case, the first lens E1 through the fourth lens E4 constitute the first lens group G1, the fifth lens E5 through the tenth lens E10 constitute the second lens group G2, and the eleventh lens E1 alone constitutes the third lens group G3; and each lens group is supported by an appropriately common supporting frame, for example. In the zooming operation, each lens group moves in one united body as a unit of each lens group, and the aperture stop FA moves in one united body with the second lens group G2. FIG. 3 also illustrates the surface number of each optical surface. Here, the reference symbols given to FIG. 3 are used independently from the other embodiments, as mentioned above; in other words, each embodiment uses independent reference symbols. Therefore, the reference symbols common to those given to FIG. 1, FIG. 2, and FIG. 4 do not necessarily represent components common to the other embodiments.

Also in FIG. 3, the optical components constituting the optical system of the zoom lens are disposed in order from the object side, the first lens E1, second lens E2, third lens E3, fourth lens E4, and aperture stop FA, fifth lens E5, sixth lens E6, seventh lens E7, eighth lens E8, ninth lens E9, tenth lens E10, eleventh lens E11, and various type filter MF. The image is formed on the back of the various type filter MF.

The first lens E1 is a negative meniscus lens formed convexly toward the object side, which has an aspherical surface on the image side. The second lens E2 is a negative lens, both surfaces of which are concave. The third lens E3 is a positive lens, both surfaces of which are convex. The fourth lens E4 is a negative lens, both surfaces of which are concave. Two pieces of the third lens E3 and the fourth lens E4 are adhered and applied to each other to be united in one body, which form a cemented lens C0. The first lens group G1 configured with the first lens E1 through the fourth lens E4 has a negative refracting power as a whole.

The fifth lens E5 is a positive meniscus lens formed convexly toward the object side, which has an aspherical surface on the object side. The sixth lens E6 is a positive meniscus lens formed convexly toward the object side. The seventh lens E7 is a negative meniscus lens formed convexly toward the object side. The eighth lens E8 is a positive meniscus lens formed convexly toward the object side. Three pieces of the sixth lens E6 through the eighth lens E8 are adhered and applied to each other to be united in one body, which form a first cemented lens C1. The ninth lens E9 is a negative meniscus lens formed convexly toward the object side. The tenth lens E10 is a positive lens having an aspherical surface on the image side, both surfaces of which are convex. Two pieces of the ninth lens E9 and the tenth lens E10 are adhered and applied to each other to be united in one body, which form a second cemented lens C2.

The second lens group G2 configured with the fifth lens E5 through the tenth lens E10 has a positive refracting power as a whole.

The eleventh lens E11 is a positive lens having an aspherical surface on the image side, both surfaces of which are convex. The third lens group G3 configured only with the eleventh lens E11 has naturally a positive refracting power.

In the changing magnification between the short focal end (wide-angle end) and the long focal end (telephoto end), variable spacings between the lens groups vary, that is, a spacing DA between the most image side surface of the first lens group G1, namely, the image side surface of the fourth lens E4 (surface number 7) and the surface of the aperture stop FA (surface number 8) positioned on the object side of the second lens group G2, which moves in one body with the second lens group G2, a spacing DB between the most image side surface of the second lens group G2, namely, the image side surface of the tenth lens E10 (surface number 17) and the most object side surface of the third lens group G3, namely, the object side surface of the eleventh lens E11 (surface number 18), and a spacing DC between the most image side surface of the third lens group G3, namely, the image side surface of the eleventh lens E11 (surface number 19) and the object side surface of the various type filter MF (surface number 20) vary. And, along with the changing magnification from the wide-angle end toward the telephoto end, the first lens group G1, the second lens group G2, and the third lens group G3 move, in a manner that the spacing DA between the first lens group G1 and the aperture stop FA (moving in one body with the second lens group G2) gradually decreases, the spacing DB between the second lens group G2 and the third lens group G3 gradually increases, and the spacing DC between the third lens group G3 and the various type filter MF increases briefly, and then decreases. In the movement along with the changing magnification from the wide-angle end toward the telephoto end, the second lens group G2 moves almost monotonously toward the object side, the first lens group G1 moves toward the image side briefly, and then moves toward the object side, and the third lens group G3 moves toward the object side briefly, and then moves toward the image side.

In the embodiment 3, the focal length of the whole system f, the F number F, and the half angle of view ω vary in the following ranges: f=5.206–14.991, F=2.59–4.54, ω=43.25–17.54. The optical characteristics of the optical components are given in the following table.

TABLE 5 optical characteristics

| surface number | R | D | $N_d$ | $v_d$ | remarks | name of glass type |
|---|---|---|---|---|---|---|
| 01 | 24.836 | 1.60 | 1.73310 | 48.89 | E1 | OHARA L-LAM72 |
| 02* | 9.152 | 3.92 | | | | |
| 03 | −291.648 | 0.90 | 1.77250 | 49.60 | E2 | OHARA S-LAH66 |
| 04 | 11.095 | 3.78 | | | | |
| 05 | 19.286 | 3.48 | 1.80100 | 34.97 | E3 | OHARA S-LAM66 |
| 06 | −35.278 | 0.80 | 1.75700 | 47.82 | E4 | OHARA S-LAM54 |
| 07 | 200.518 | (DA) variable | | | | |
| 08 | aperture stop | 1.00 | | | | |
| 09* | 8.011 | 1.66 | 1.79952 | 42.22 | E5 | OHARA S-LAH52 |
| 10 | 28.538 | 0.59 | | | | |
| 11 | 8.349 | 1.38 | 1.77250 | 49.60 | E6 | OHARA S-LAH66 |
| 12 | 56.832 | 0.54 | 1.80100 | 34.97 | E7 | OHARA S-LAM66 |
| 13 | 4.000 | 2.03 | 1.48749 | 70.24 | E8 | OHARA S-FSL5 |
| 14 | 5.976 | 0.44 | | | | |
| 15 | 12.402 | 0.50 | 1.68893 | 31.07 | E9 | OHARA S-TIM28 |
| 16 | 6.376 | 1.85 | 1.43875 | 94.94 | E10 | OHARA S-FPL53 |
| 17* | −48.301 | (DB) variable | | | | |
| 18 | 12.225 | 2.77 | 1.43875 | 94.94 | E11 | OHARA S-FPL53 |
| 19* | −120.579 | (DC) variable | | | | |
| 20 | ∞ | 1.24 | 1.51680 | 64.20 | MF | |
| 21 | ∞ | | | | | |

The optical surfaces of the second surface, ninth surface, seventeenth surface, and nineteenth surface wherein the asterisk mark * is applied to the surface number in Table 5 are aspherical, and the parameters of the aspherical surfaces in the formula (1) are as follows.

Aspherical surface: the second surface
K=0.0,
$A_4=-1.39387\times10^4$
$A_6=-7.80179\times10^{-7}$,
$A_8=-6.87645\times10^{-9}$,
$A_{10}=-1.52963\times10^{-10}$,
$A_{12}=-3.38847\times10^{-12}$,
$A_{14}=2.20046\times10^{-14}$,
$A_{16}=8.85391\times10^{-16}$,
$A_{18}=-1.29685\times10^{-17}$ Aspherical surface: the ninth surface
K=0.0,
$A_4=-1.06101\times10^{-4}$,
$A_6=2.72443\times10^{-7}$,
$A_8=-1.08617\times10^{-7}$,
$A_{10}=-2.33258\times10^{-9}$ Aspherical surface: the seventeenth surface
K=0.0,
$A_4=1.38067\times10^{-4}$,
$A_6=2.21574\times10^{-5}$,
$A_8=-4.54215\times10^{-6}$,
$A_{10}=2.25263\times10^{-7}$ Aspherical surface: the nineteenth surface
K=0.0,
$A_4=7.83132\times10^{-5}$,
$A_6=-7.56154\times10^{-6}$,
$A_8=1.72007\times10^{-7}$,
$A_{10}=-1.73437\times10^{-9}$ The variable spacing DA between the first lens group G1 and the aperture stop FA (the second lens group G2), the variable spacing DB between the second lens group G2 and the third lens group G3, and the variable spacing DC between the third lens group G3 and the various type filter MF are made to vary along with the zooming, as the following Table.

TABLE 6

| | variable spacing | | |
|---|---|---|---|
| | short focal end | medium focal length | long focal end |
| f | 5.21 | 8.84 | 14.99 |
| DA | 20.728 | 7.873 | 1.828 |
| DB | 3.666 | 7.944 | 18.091 |
| DC | 3.876 | 4.489 | 2.828 |

The values relating to the above conditional expressions in the embodiment 3 are as follows.

Values of the conditional expressions
$n_{c1-1}=1.77250$
$n_{c1-2}=1.80100$
$v_{c1-1}-v_{c1-2}=14.63$
$v_{c1-3}=70.24$
$d_{c1-2}/d_{c1-all}=0.137$
$(R_{c1-1}-R_{c1-3})/(R_{c1-1}+R_{c1-3})=0.352$
$(R_{c1-3}-R_{c1-4})/(R_{c1-3}+R_{c1-4})=-0.198$
$v_{c2-2}=94.94$ Thus, the above values relating to the above conditional expressions in the embodiment 3 are within the ranges of the conditional expressions.

Embodiment 4

Figure 4:
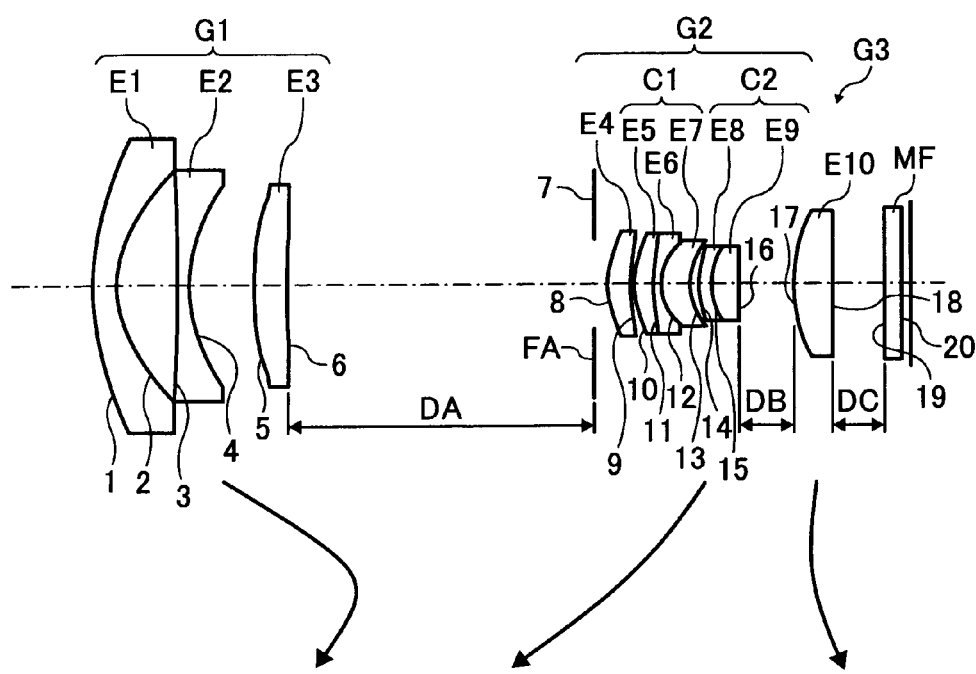
FIG. 4 is a sectional view typically illustrating the configuration of the optical system along the optical axis of the zoom lens relating to the fourth embodiment of the present invention.

FIG. 4 illustrates a configuration of an optical system of the zoom lens relating to the embodiment 4, in which the arrows typically illustrate a schematic movement locus of each lens group along with the zooming from the short focal end (wide-angle end) to the long focal end (telephoto end) through the medium focal length.

The zoom lens illustrated in FIG. 4 includes a first lens E1, second lens E2, third lens E3, fourth lens E4, fifth lens E5, sixth lens E6, seventh lens E7, eighth lens E8, ninth lens E9, tenth lens E10, aperture stop FA, and various type filter MF. In this case, the first lens E1 through the third lens E3 constitute the first lens group G1, the fourth lens E4 through the ninth lens E9 constitute the second lens group G2, and the tenth lens E10 alone constitutes the third lens group G3; and each lens group is supported by an appropriately common supporting frame, for example. In the zooming operation, each lens group moves in one united body as a unit of each lens group, and the aperture stop FA moves in one united body with the second lens group G2. FIG. 4 also illustrates the surface number of each optical surface. Here, the reference symbols given to FIG. 4 are used independently from the other embodiments, as mentioned above; in other words, each embodiment uses independent reference symbols. Therefore, the reference symbols common to those given to FIG. 1 through FIG. 3 do not necessarily represent components common to the other embodiments.

In FIG. 4, the optical components constituting the optical system of the zoom lens are disposed in order from the object side, the first lens E1, second lens E2, third lens E3, aperture stop FA, fourth lens E4, fifth lens E5, sixth lens E6, seventh lens E7, eighth lens E8, ninth lens E9, tenth lens E10, and various type filter MF. The image is formed on the back of the various type filter MF.

The first lens E1 is a negative meniscus lens formed convexly toward the object side, which has an aspherical surface on the image side. The second lens E2 is a negative lens, both surfaces of which are concave. The third lens E3 is a positive meniscus lens formed convexly toward the object side. The first lens group G1 configured with the first lens E1 through the third lens E3 has a negative refracting power as a whole.

The fourth lens E4 is a positive meniscus lens formed convexly toward the object side, which has an aspherical surface on the object side. The fifth lens E5 is a positive meniscus lens formed convexly toward the object side, the sixth lens E6 is a negative meniscus lens formed convexly toward the object side, and the seventh lens E7 is a positive meniscus lens formed convexly toward the object side. Three pieces of the fifth lens E5 through the seventh lens E7 are adhered and applied to each other to be united in one body, which form a first cemented lens C1.

The eighth lens E8 is a negative meniscus lens formed convexly toward the object side, and the ninth lens E9 is a positive lens having an aspherical surface on the image side, both surfaces of which are convex. Two pieces of the eighth lens E8 and the ninth lens E9 are adhered and applied to each other to be united in one body, which form a second cemented lens C2. The second lens group G2 configured with the fourth lens E4 through the ninth lens E9 has a positive refracting power as a whole.

The tenth lens E10 is a positive lens having an aspherical surface on the image side, both surfaces of which are convex. The third lens group G3 configured with only the tenth lens E10 has naturally a positive refracting power.

In the changing magnification between the short focal end (wide-angle end) and the long focal end (telephoto end), variable spacings between the lens groups vary, that is, a spacing DA between the most image side surface of the first lens group G1, namely, the image side surface of the third lens E3 (surface number 6) and the surface of the aperture stop FA (surface number 7) positioned on the object side of the second lens group G2, which moves in one body with the second lens group G2, a spacing DB between the most image side surface of the second lens group G2, namely, the image side surface of the ninth lens E9 (surface number 16) and the most object side surface of the third lens group G3, namely, the object side surface of the tenth lens E10 (surface number 17), and a spacing DC between the most image side surface of the third lens group G3, namely, the image side surface of the tenth lens E10 (surface number 18) and the object side surface of the various type filter MF (surface number 19) vary. And, along with the changing magnification from the wide-angle end toward the telephoto end, the first lens group G1, the second lens group G2, and the third lens group G3 move, in a manner that the spacing DA between the first lens group G1 and the aperture stop FA (moving in one body with the second lens group G2) gradually decreases, the spacing DB between the second lens group G2 and the third lens group G3 gradually increases, and the spacing DC between the third lens group G3 and the various type filter MF increases briefly, and then decreases.

In the movement along with the changing magnification from the wide-angle end toward the telephoto end, the second lens group G2 moves almost monotonously toward the object side, the first lens group G1 moves toward the image side briefly, and then moves toward the object side, and the third lens group G3 moves toward the object side briefly, and then moves toward the image side.

In the embodiment 4, the focal length of the whole system f, the F number F, and the half angle of view ω vary in the following ranges with the zooming: f=5.203–14.987, F=2.67–4.65, ω=43.29–17.55. The optical characteristics of the optical components are given in the following table.

TABLE 7 optical characteristics

| surface number | R | D | $N_d$ | $v_d$ | remarks | name of glass type |
|---|---|---|---|---|---|---|
| 01 | 24.174 | 1.60 | 1.73310 | 48.89 | E1 | OHARA L-LAM72 |
| 02* | 9.083 | 4.04 | | | | |
| 03 | −235.224 | 0.90 | 1.74400 | 44.79 | E2 | OHARA S-LAM2 |
| 04 | 12.103 | 4.49 | | | | |
| 05 | 22.320 | 2.40 | 1.80518 | 25.42 | E3 | OHARA S-TIH6 |
| 06 | 250.000 | (DA) variable | | | | |
| 07 | aperture stop | 1.00 | | | | |
| 08* | 7.942 | 1.60 | 1.79952 | 42.22 | E4 | OHARA S-LAH52 |
| 09 | 21.855 | 0.12 | | | | |
| 10 | 6.936 | 1.40 | 1.80610 | 40.93 | E5 | OHARA S-LAH53 |
| 11 | 20.381 | 0.50 | 1.85000 | 32.40 | E6 | SUMITA K-LaSFn21 |
| 12 | 3.806 | 1.99 | 1.48749 | 70.24 | E7 | OHARA S-FSL5 |
| 13 | 5.329 | 0.62 | | | | |
| 14 | 9.407 | 0.84 | 1.68893 | 31.07 | E8 | OHARA S-TIM28 |
| 15 | 4.986 | 1.96 | 1.43875 | 94.94 | E9 | OHARA S-FPL53 |
| 16* | −97.685 | (DB) variable | | | | |
| 17 | 11.518 | 2.75 | 1.43875 | 94.94 | E10 | OHARA S-FPL53 |
| 18* | −267.775 | (DC) variable | | | | |
| 19 | ∞ | 1.24 | 1.51680 | 64.20 | | MF |
| 20 | ∞ | | | | | |

The optical surfaces of the second surface, eighth surface, sixteenth surface, and eighteenth surface wherein the asterisk mark * is applied to the surface number in Table 7 are aspherical, and the parameters of the aspherical surfaces in the formula (1) are as follows.

Aspherical surface: the second surface
K=0.0,
$A_4 = -1.27855 \times 10^{-4}$,
$A_6 = -6.57584 \times 10^{-7}$,
$A_8 = -8.49625 \times 10^{-9}$,
$A_{10} = -1.27642 \times 10^{-10}$,
$A_{12} = -3.39257 \times 10^{-12}$,
$A_{14} = 2.28913 \times 10^{-14}$,
$A_{16} = 9.13355 \times 10^{-16}$
$A_{18} = -1.41491 \times 10^{-17}$ Aspherical surface: the eighth surface
K=0.0,
$A_4=-9.07488\times10^{-5}$,
$A_6=5.83969\times10^{-7}$,
$A_8=-1.21765\times10^{-7}$,
$A_{10}=3.21079\times10^{-9}$ Aspherical surface: the sixteenth surface
K=0.0,
$A_4=4.63337\times10^{-5}$,
$A_6=1.96988\times10^{-5}$,
$A_8=-6.18745\times10^{-6}$,
$A_{10}=2.53045\times10^{-7}$ Aspherical surface: the eighteenth surface
K=0.0,
$A_4=1.02119\times10^{-4}$,
$A_6=-8.13158\times10^{-6}$,
$A_8=1.72125\times10^{-7}$,
$A_{10}=-1.60528\times10^{-9}$ The variable spacing DA between the first lens group G1 and the aperture stop FA (the second lens group G2), the variable spacing DB between the second lens group G2 and the third lens group G3, and the variable spacing DC between the third lens group G3 and the various type filter MF are made to vary along with the zooming, as the following Table.

TABLE 8

| | variable spacing | | |
|---|---|---|---|
| | short focal end | medium focal length | long focal end |
| f | 5.20 | 8.83 | 15.00 |
| DA | 21.126 | 8.000 | 1.822 |
| DB | 3.668 | 7.597 | 17.361 |
| DC | 3.513 | 4.265 | 2.813 |

The values relating to the above conditional expressions in the embodiment 4 are as follows.

Values of the conditional expressions
$n_{c1-1}=1.80610$
$n_{c1-2}=1.85000$
$v_{c1-1}-v_{c1-2}=8.53$
$v_{c1-3}=70.24$
$d_{c1-2}/d_{c1-all}=0.129$
$(R_{c1-1}-R_{c1-3})/(R_{c1-1}+R_{c1-3})=0.291$
$(R_{c1-3}-R_{c1-4})/(R_{c1-3}+R_{c1-4})=-0.167$
$v_{c2-2}=94.94$ Thus, the above values relating to the above conditional expressions in the embodiment 4 are within the ranges of the conditional expressions.

Embodiment 5

Figure 5:
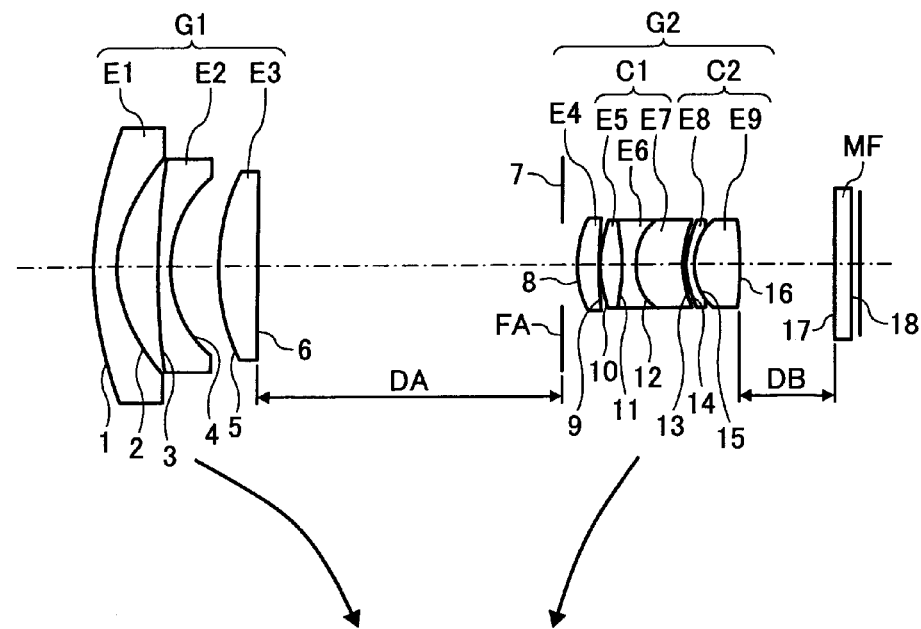
FIG. 5 is a sectional view typically illustrating the configuration of the optical system along the optical axis of the zoom lens relating to the fifth embodiment of the present invention.

FIG. 5 illustrates a configuration of an optical system of the zoom lens relating to the embodiment 5, in which the arrows typically illustrate a schematic movement locus of each lens group along with the zooming from the short focal end (wide-angle end) to the long focal end (telephoto end) through the medium focal length.

The zoom lens illustrated in FIG. 5 includes a first lens E1, second lens E2, third lens E3, fourth lens E4, fifth lens E5, sixth lens E6, seventh lens E7, eighth lens E8, ninth lens E9, aperture stop FA, and various type filter MF. In this case, the first lens E1 through the third lens E3 constitute the first lens group G1, and the fourth lens E4 through the ninth lens E9 constitute the second lens group G2. In this embodiment 5 does not exist the third lens group G3. The first lens group G1 and the second lens group G2 each are supported by an appropriately common supporting frame, for example. In the zooming operation, each lens group moves in one united body as a unit of each lens group, and the aperture stop FA moves in one united body with the second lens group G2. FIG. 5 also illustrates the surface number of each optical surface. Here, the reference symbols given to FIG. 5 are used independently from the other embodiments, as mentioned above; in other words, each embodiment uses independent reference symbols. Therefore, the reference symbols common to those given to FIG. 1 through FIG. 4 and FIG. 5 do not necessarily represent components common to the other embodiments.

In FIG. 5, the optical components constituting the optical system of the zoom lens are disposed in order from the object side, the first lens E1, second lens E2, third lens E3, aperture stop FA, fourth lens E4, fifth lens E5, sixth lens E6, seventh lens E7, eighth lens E8, ninth lens E9, and various type filter MF. The image is formed on the back of the various type filter MF.

The first lens E1 is a negative meniscus lens formed convexly toward the object side, which has an aspherical surface on the image side. The second lens E2 is a negative meniscus lens facing a convex surface toward the object side. The third lens E3 is a positive meniscus lens formed convexly toward the object side. The first lens group G1 configured with the first lens E1 through the third lens E3 has a negative refracting power as a whole.

The fourth lens E4 is a positive meniscus lens formed convexly toward the object side, which has an aspherical surface on the object side. The fifth lens E5 is a both-surface convex lens, the sixth lens E6 is a both-surface concave lens, and the seventh lens E7 is a positive meniscus lens formed convexly toward the object side. Three pieces of the fifth lens E5 through the seventh lens E7 are adhered and applied to each other to be united in one body, which form a first cemented lens C1. The eighth lens E8 is a negative meniscus lens formed convexly toward the object side, and the ninth lens E9 is a positive lens having an aspherical surface on the image side, both surfaces of which are convex. Two pieces of the eighth lens E8 and the ninth lens E9 are adhered and applied to each other to be united in one body, which form a second cemented lens C2. The second lens group G2 configured with the fourth lens E4 through the ninth lens E9 has a positive refracting power as a whole.

The embodiment 5 does not use the third lens group G3 configured with a positive lens having an aspherical surface on the image side, which is different from the embodiment 1 through the embodiment 4.

In the changing magnification between the short focal end (wide-angle end) and the long focal end (telephoto end), variable spacings between the lens groups vary, that is, a spacing DA between the most image side surface of the first lens group G1, namely, the image side surface of the third lens E3 (surface number 6) and the surface of the aperture stop FA (surface number 7) positioned on the object side of the second lens group G2, which moves in one body with the second lens group G2, and a spacing DB between the most image side surface of the second lens group G2, namely, the image side surface of the ninth lens E9 (surface number 16) and the object side surface of the various type filter MF (surface number 17) vary. And, along with the changing magnification from the wide-angle end toward the telephoto end, the first lens group G1 and the second lens group G2 move, in a manner that the spacing DA between the first lens group G1 and the aperture stop FA (moving in one body with the second lens group G2) gradually decreases, the spacing DB between the second lens group G2 and the various type filter MF gradually increases. In the movement along with the changing magnification from the wide-angle end toward the telephoto end, the first lens group G1 and the second lens group G2 move as the locus diagram illustrated in FIG. 5.

In the embodiment 5, the focal length of the whole system f, the F number F, and the half angle of view ω vary in the following ranges: f=5.240–13.102, F=2.90–4.20, ω=43.05–19.72. The optical characteristics of the optical components are given in the following table.

The variable spacing DA between the first lens group G1 and the aperture stop FA (the second lens group G2) and the variable spacing DB between the second lens group G2 and the various type filter MF are made to vary along with the zooming, as the following Table.

TABLE 9 optical characteristics

| surface number | R | D | $N_d$ | $v_d$ | remarks | name of glass type |
|---|---|---|---|---|---|---|
| 01 | 26.994 | 1.60 | 1.73310 | 48.89 | E1 | OHARA L-LAM72 |
| 02* | 9.233 | 3.01 | | | | |
| 03 | 54.196 | 0.90 | 1.77250 | 49.60 | E2 | OHARA S-LAH66 |
| 04 | 8.750 | 3.60 | | | | |
| 05 | 16.669 | 2.89 | 1.71736 | 29.52 | E3 | OHARA S-TIH1 |
| 06* | 250.000 | variable (DA) | | | | |
| 07 | aperture stop | 1.00 | | | FA | |
| 08* | 8.038 | 1.57 | 1.79952 | 42.22 | E4 | OHARA S-LAH52 |
| 09 | 35.515 | 0.10 | | | | |
| 10 | 10.515 | 1.56 | 1.77250 | 49.60 | E5 | OHARA S-LAH66 |
| 11 | −13.804 | 0.96 | 1.83400 | 37.16 | E6 | OHARA S-LAH60 |
| 12 | 4.277 | 3.53 | 1.49700 | 81.54 | E7 | OHARA S-FPL51 |
| 13 | 8.000 | 0.25 | | | | |
| 14 | 7.230 | 0.50 | 1.73400 | 51.47 | E8 | OHARA S-LAL59 |
| 15 | 4.239 | 3.40 | 1.43875 | 94.94 | E9 | OHARA S-FPL53 |
| 16* | −19.927 | variable (DB) | | | | |
| 17 | ∞ | 1.24 | 1.51680 | 64.20 | | MF |
| 18 | ∞ | | | | | |

The optical surfaces of the second surface, sixth surface, eighth surface, and sixteenth surface, wherein the asterisk mark * is applied to the surface number in Table 9 are aspherical, and the parameters of the aspherical surfaces in the formula (1) are as follows.

Aspherical surface: the second surface
K=0.0,
$A_4$=−1.05887×10$^4$,
$A_6$=−2.34930×10$^{-6}$,
$A_8$=8.58632×10$^{-9}$,
$A_{10}$=−8.29139×10$^{-11}$,
$A_{12}$=−4.17598×10$^{-12}$,
$A_{14}$=1.45126×10$^{-14}$,
$A_{16}$=9.40862×10$^{-16}$,
$A_{18}$=−1.23380×10$^{-17}$ Aspherical surface: the sixth surface
K=0.0,
$A_4$=−2.66404×10$^{-5}$,
$A_6$=2.51497×10$^{-7}$,
$A_8$=−1.81549×10$^{-8}$,
$A_{10}$=9.02091×10$^{-11}$ Aspherical surface: the eighth surface
K=0.0,
$A_4$=−8.70033×10$^{-5}$,
$A_6$=4.18211×10$^{-7}$,
$A_8$=−1.17839×10$^{-7}$,
$A_{10}$=4.35044×10$^{-9}$ Aspherical surface: the sixteenth surface
K=0.0,
$A_4$=2.47518×10$^{-4}$,
$A_6$=4.61017×10$^{-6}$,
$A_8$=−2.17379×10$^{-6}$,
$A_{10}$=1.54197×10$^{-8}$

TABLE 10 variable spacing

| | short focal end | medium focal length | long focal end |
|---|---|---|---|
| f | 5.24 | 8.13 | 13.10 |
| DA | 22.434 | 10.222 | 1.816 |
| DB | 6.760 | 9.309 | 13.696 |

The values relating to the above conditional expressions in the embodiment 5 are as follows.

Values of the conditional expressions
$n_{c1-1}$=1.79952
$n_{c1-2}$=1.77250
$v_{c1-1}-v_{c1-2}$=12.44
$v_{c1-3}$=81.54
$d_{c1-2}/d_{c1-all}$=0.159
$(R_{c1-1}-R_{c1-3})/(R_{c1-1}+R_{c1-3})$=0.422
$(R_{c1-3}-R_{c1-4})/(R_{c1-3}+R_{c1-4})$=−0.303
$v_{c2-2}$=94.94

Thus, the above values are within the ranges of the conditional expressions.

Figure 6:
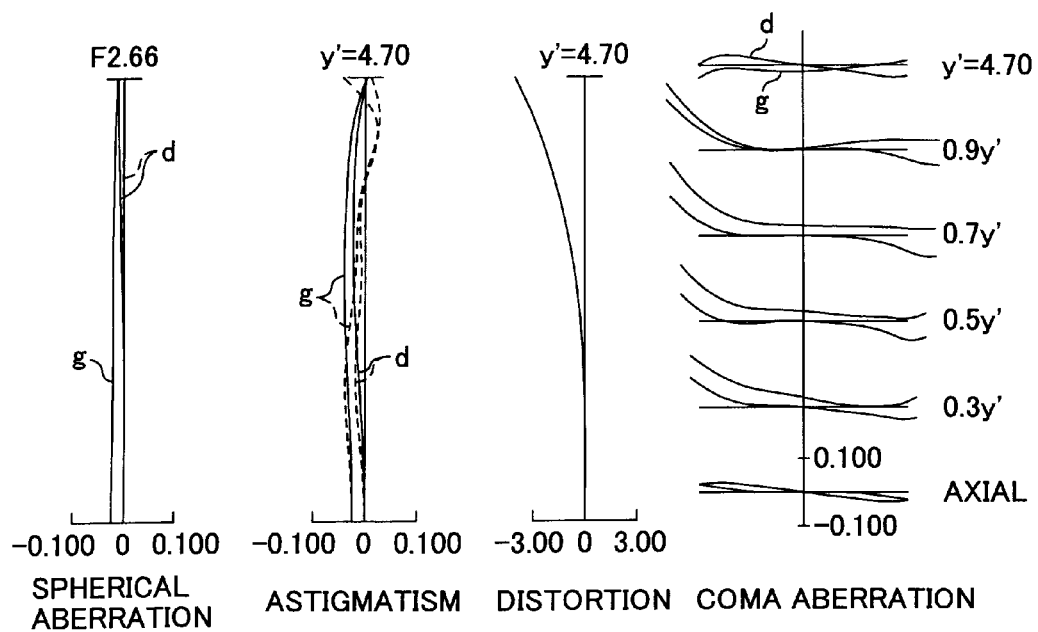
FIG. 6 is an aberration curve showing the spherical aberration, astigmatism, distortion, and coma aberration at the wide-angle end, of the zoom lens relating to the embodiment 1 illustrated in FIG. 1.

FIG. 6 through FIG. 8 show the aberration curves of the spherical aberration, astigmatism, distortion, and coma aberration of the zoom lens illustrated in FIG. 1 relating to the aforementioned embodiment 1, in which FIG. 6 shows the aberration curve at the wide-angle end, FIG. 7 shows the aberration curve at the medium focal length, and FIG. 8 shows the aberration curve at the telephoto end. In each of the aberration curves, the dashed line in the spherical aberration curve represents the sine condition; the solid line in the astigmatism curve represents the sagittal, and the dashed line represents the meridional; and the thick line represents d-line, and the thin line represents g-line.

Figure 9:
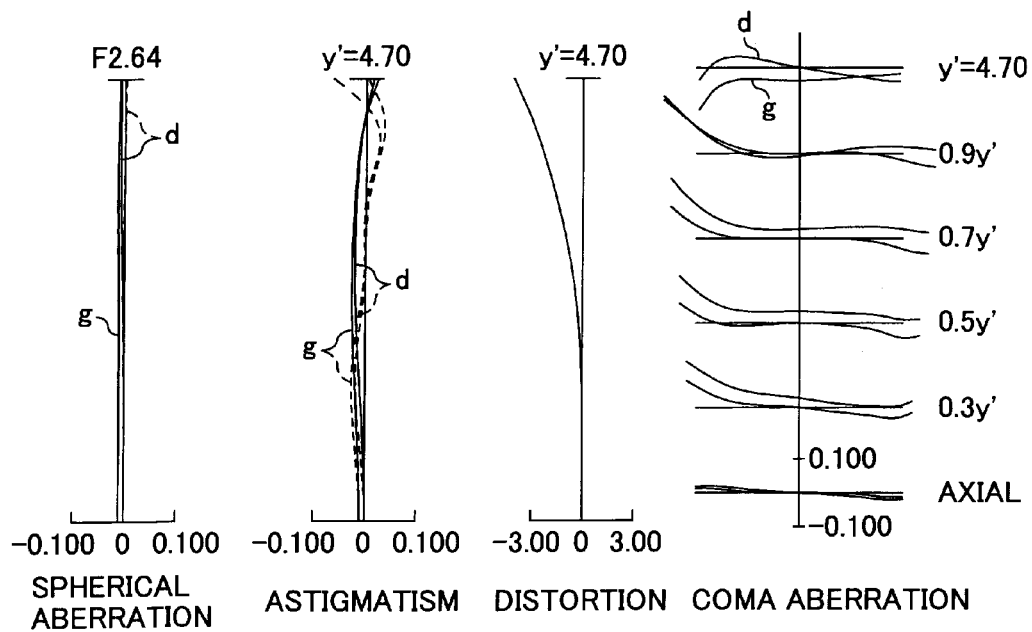
FIG. 9 is an aberration curve showing the spherical aberration, astigmatism, distortion, and coma aberration at the wide-angle end, of the zoom lens relating to the embodiment 2 illustrated in FIG. 2.
Figure 10:
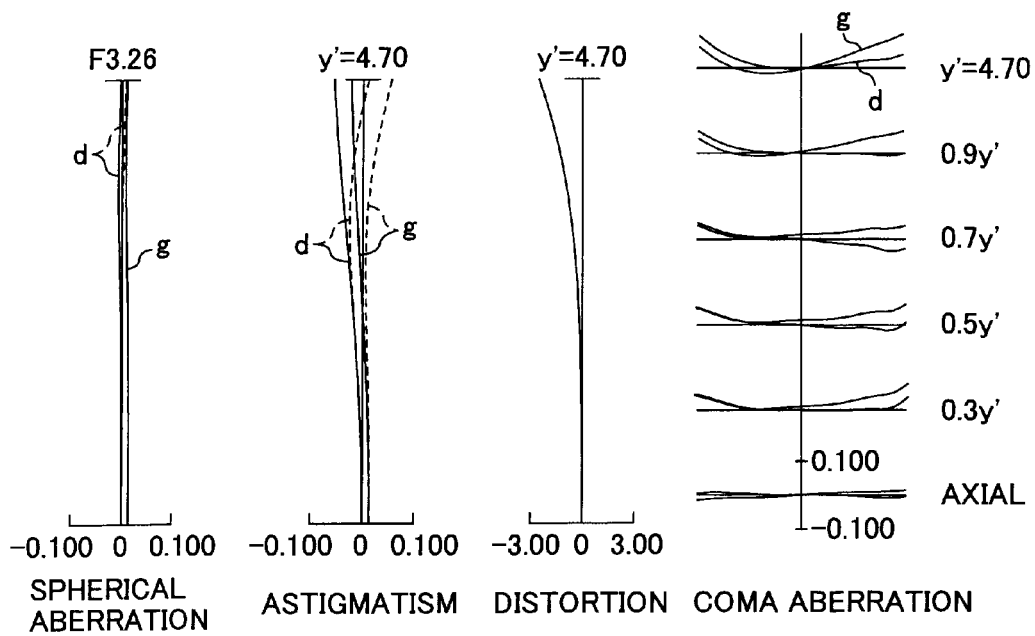
FIG. 10 is an aberration curve showing the spherical aberration, astigmatism, distortion, and coma aberration at the medium focal length, of the zoom lens relating to the embodiment 2 illustrated in FIG. 2.
Figure 11:
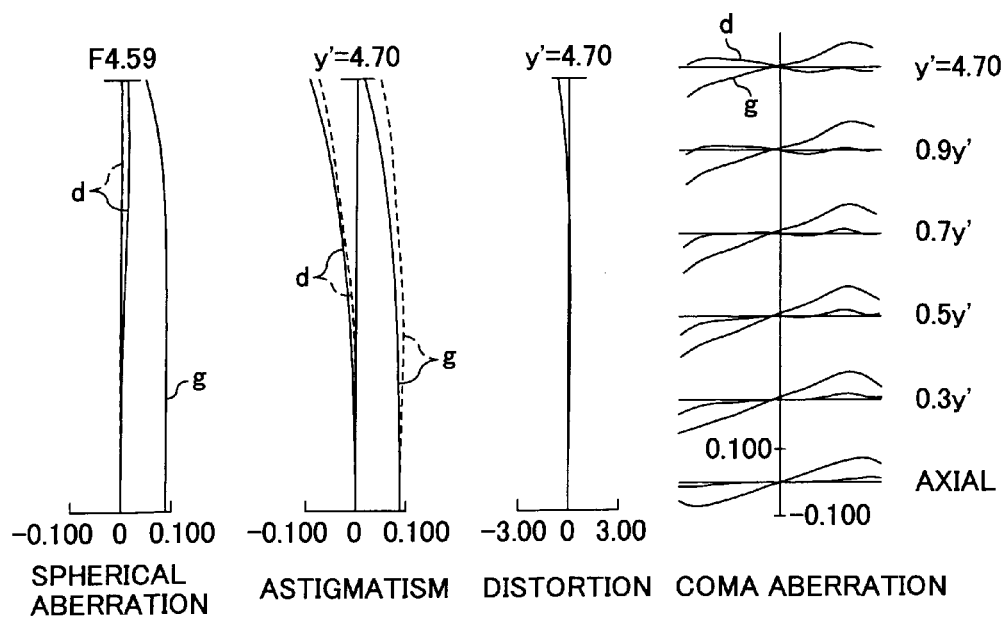
FIG. 11 is an aberration curve showing the spherical aberration, astigmatism, distortion, and coma aberration at the telephoto end, of the zoom lens relating to the embodiment 2 illustrated in FIG. 2.

FIG. 9 through FIG. 11 show the aberration curves of the spherical aberration, astigmatism, distortion, and coma aberration of the zoom lens illustrated in FIG. 2 relating to the aforementioned embodiment 2, in which FIG. 9 shows the aberration curve at the wide-angle end, FIG. 10 shows the aberration curve at the medium focal length, and FIG. 11 shows the aberration curve at the telephoto end. In each of the aberration curves, the dashed line in the spherical aberration curve represents the sine condition; the solid line in the astigmatism curve represents the sagittal, and the dashed line represents the meridional; and the thick line represents d-line, and the thin line represents g-line.

Figure 12:
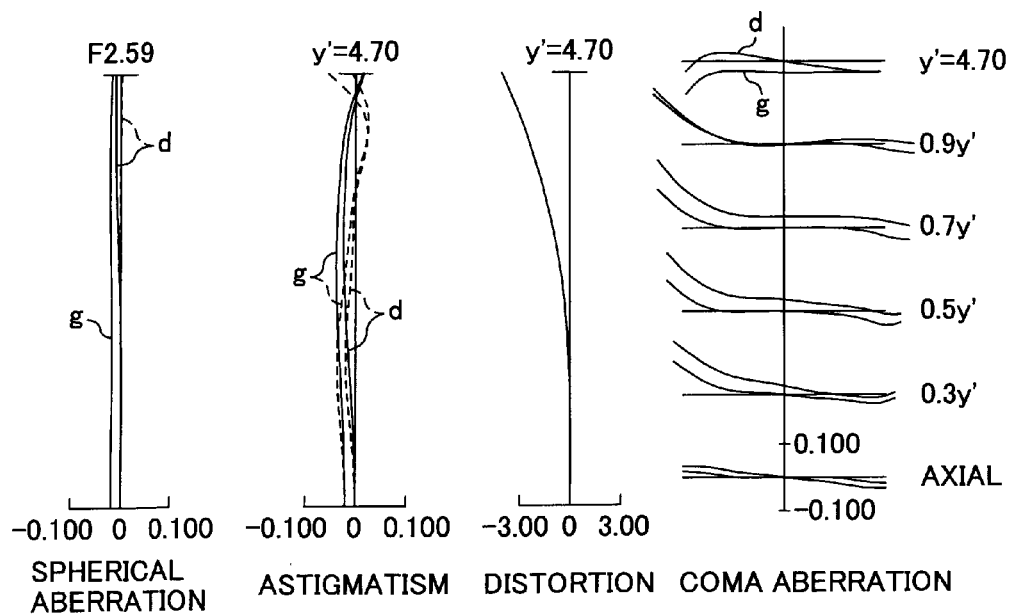
FIG. 12 is an aberration curve showing the spherical aberration, astigmatism, distortion, and coma aberration at the wide-angle end, of the zoom lens relating to the embodiment 3 illustrated in FIG. 3.
Figure 13:
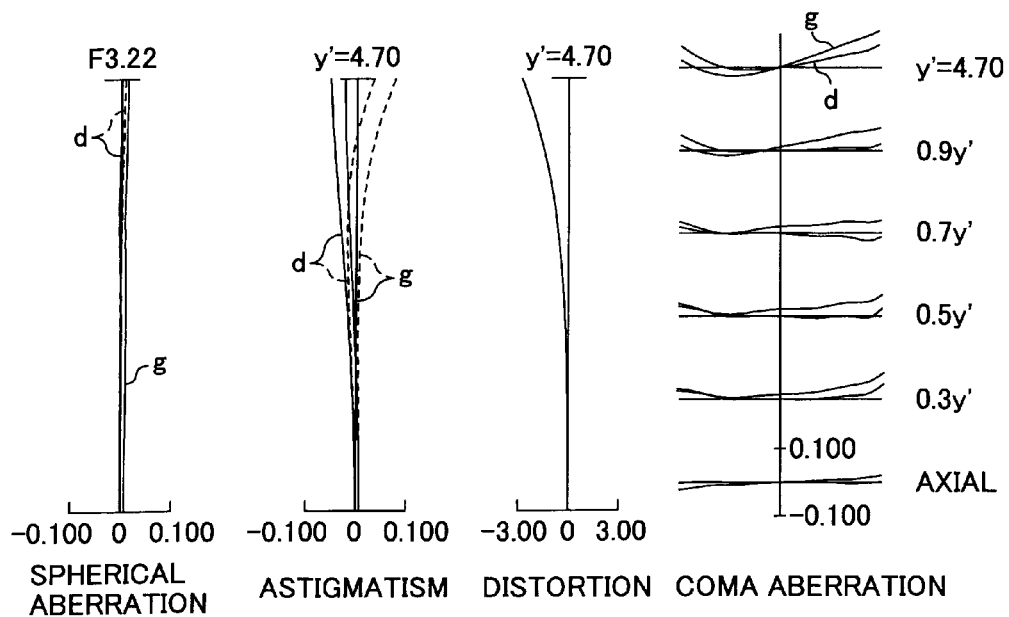
FIG. 13 is an aberration curve showing the spherical aberration, astigmatism, distortion, and coma aberration at the medium focal length, of the zoom lens relating to the embodiment 3 illustrated in FIG. 3.
Figure 14:
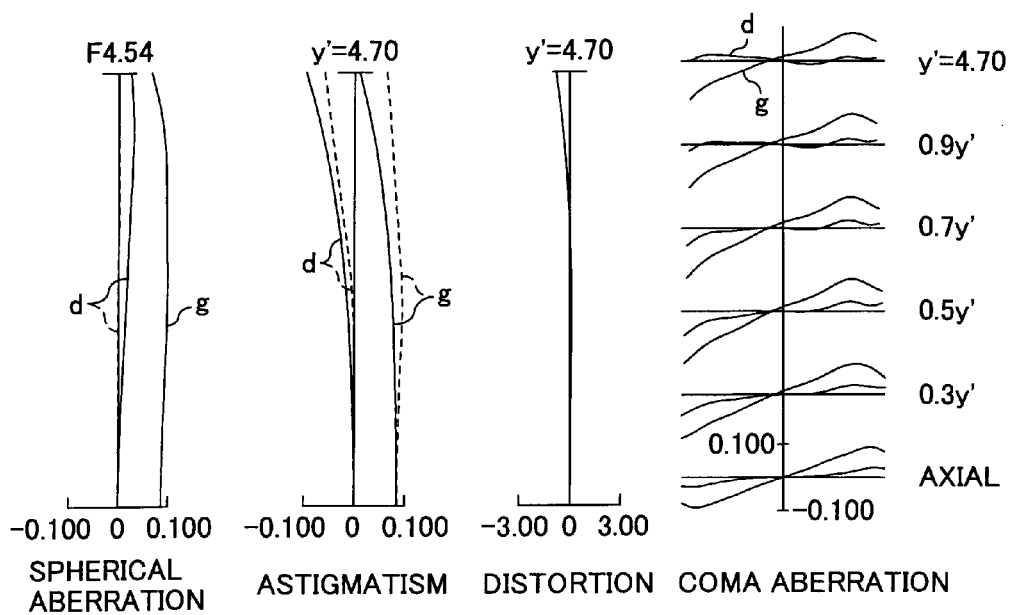
FIG. 14 is an aberration curve showing the spherical aberration, astigmatism, distortion, and coma aberration at the telephoto end, of the zoom lens relating to the embodiment 3 illustrated in FIG. 3.

FIG. 12 through FIG. 14 show the aberration curves of the spherical aberration, astigmatism, distortion, and coma aberration of the zoom lens illustrated in FIG. 3 relating to the aforementioned embodiment 3, in which FIG. 12 shows the aberration curve at the wide-angle end, FIG. 13 shows the aberration curve at the medium focal length, and FIG. 14 shows the aberration curve at the telephoto end. In each of the aberration curves, the dashed line in the spherical aberration curve represents the sine condition; the solid line in the astigmatism curve represents the sagittal, and the dashed line represents the meridional; and the thick line represents d-line, and the thin line represents g-line.

Figure 15:
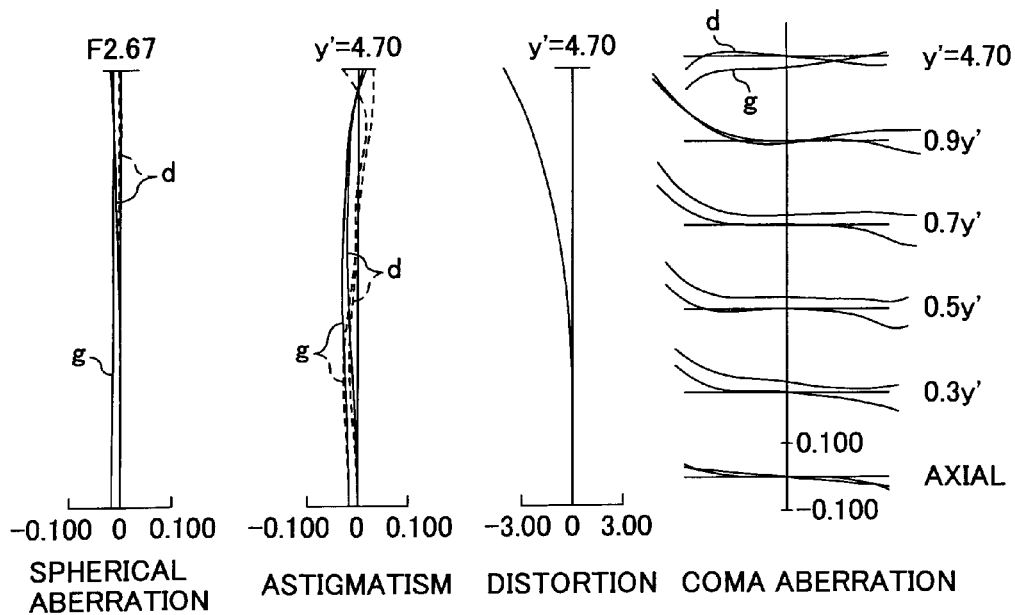
FIG. 15 is an aberration curve showing the spherical aberration, astigmatism, distortion, and coma aberration at the wide-angle end, of the zoom lens relating to the embodiment 4 illustrated in FIG. 4.
Figure 16:
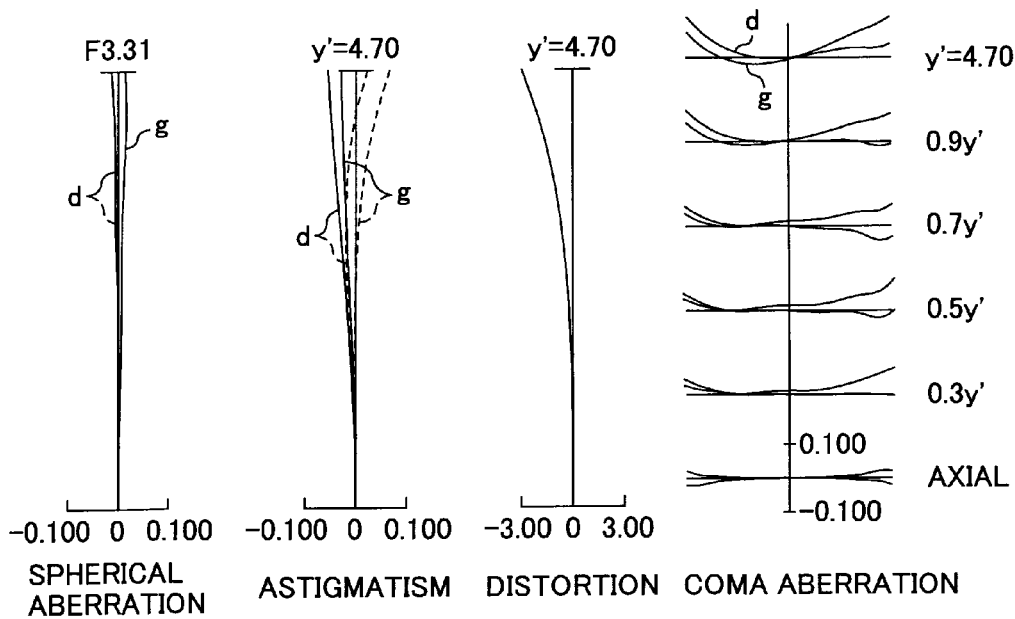
FIG. 16 is an aberration curve showing the spherical aberration, astigmatism, distortion, and coma aberration at the medium focal length, of the zoom lens relating to the embodiment 4 illustrated in FIG. 4.
Figure 17:
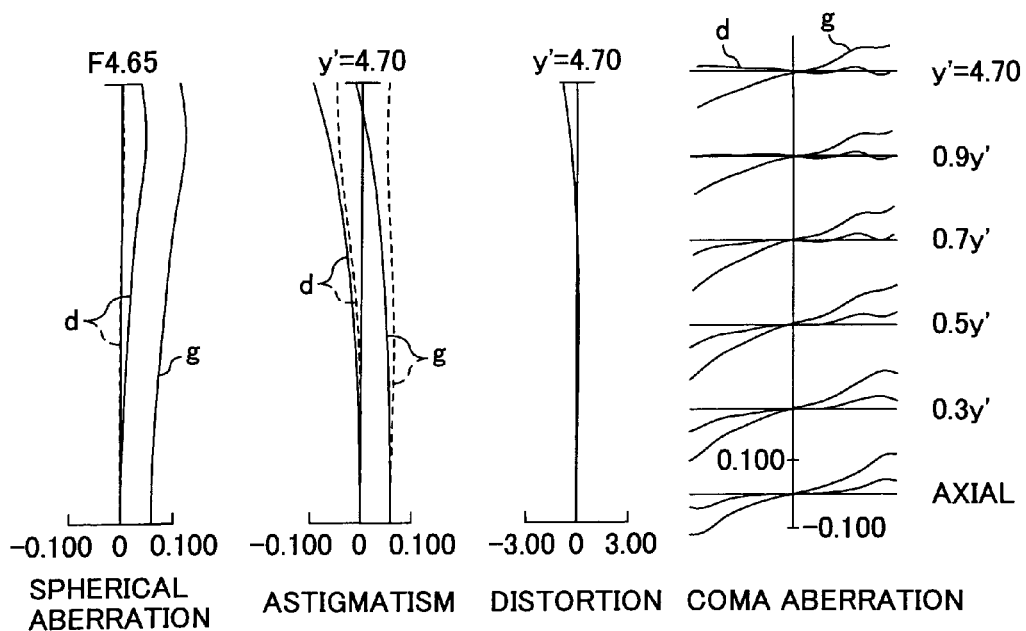
FIG. 17 is an aberration curve showing the spherical aberration, astigmatism, distortion, and coma aberration at the telephoto end, of the zoom lens relating to the embodiment 4 illustrated in FIG. 4.

FIG. 15 through FIG. 17 show the aberration curves of the spherical aberration, astigmatism, distortion, and coma aberration of the zoom lens illustrated in FIG. 4 relating to the aforementioned embodiment 4, in which FIG. 15 shows the aberration curve at the wide-angle end, FIG. 16 shows the aberration curve at the medium focal length, and FIG. 17 shows the aberration curve at the telephoto end. In each of the aberration curves, the dashed line in the spherical aberration curve represents the sine condition; the solid line in the astigmatism curve represents the sagittal, and the dashed line represents the meridional; and the thick line represents d-line, and the thin line represents g-line.

Figure 18:
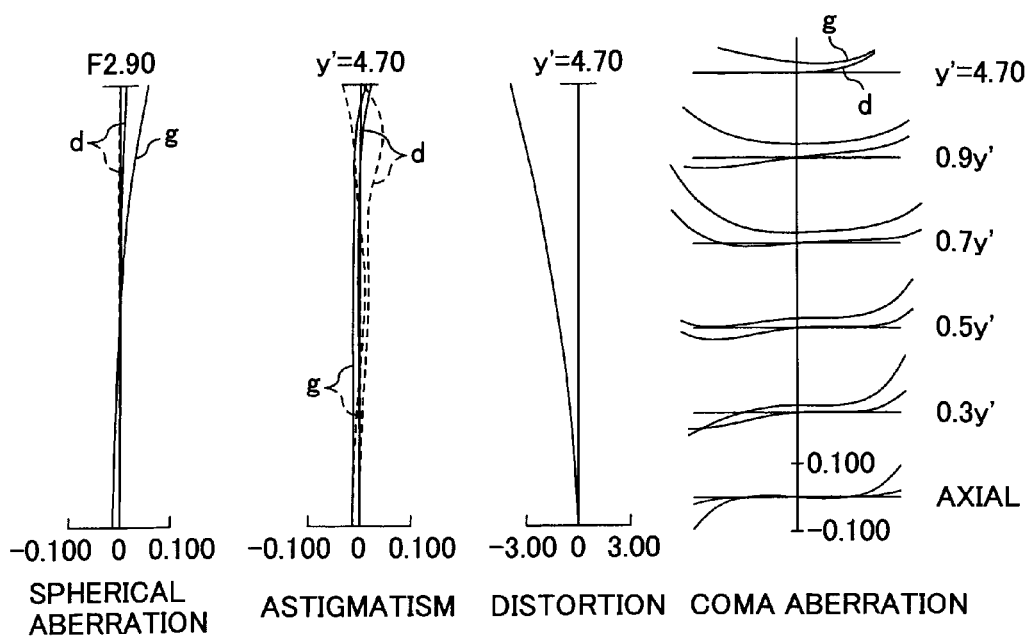
FIG. 18 is an aberration curve showing the spherical aberration, astigmatism, distortion, and coma aberration at the wide-angle end, of the zoom lens relating to the embodiment 5 illustrated in FIG. 5.
Figure 19:
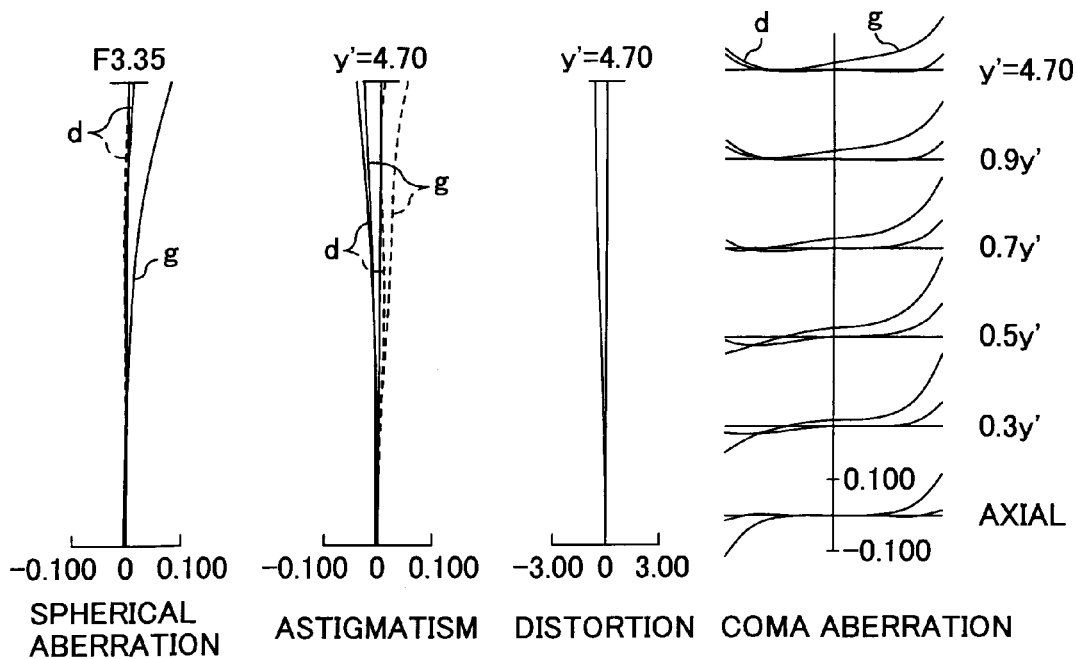
FIG. 19 is an aberration curve showing the spherical aberration, astigmatism, distortion, and coma aberration at the medium focal length, of the zoom lens relating to the embodiment 5 illustrated in FIG. 5.
Figure 20:
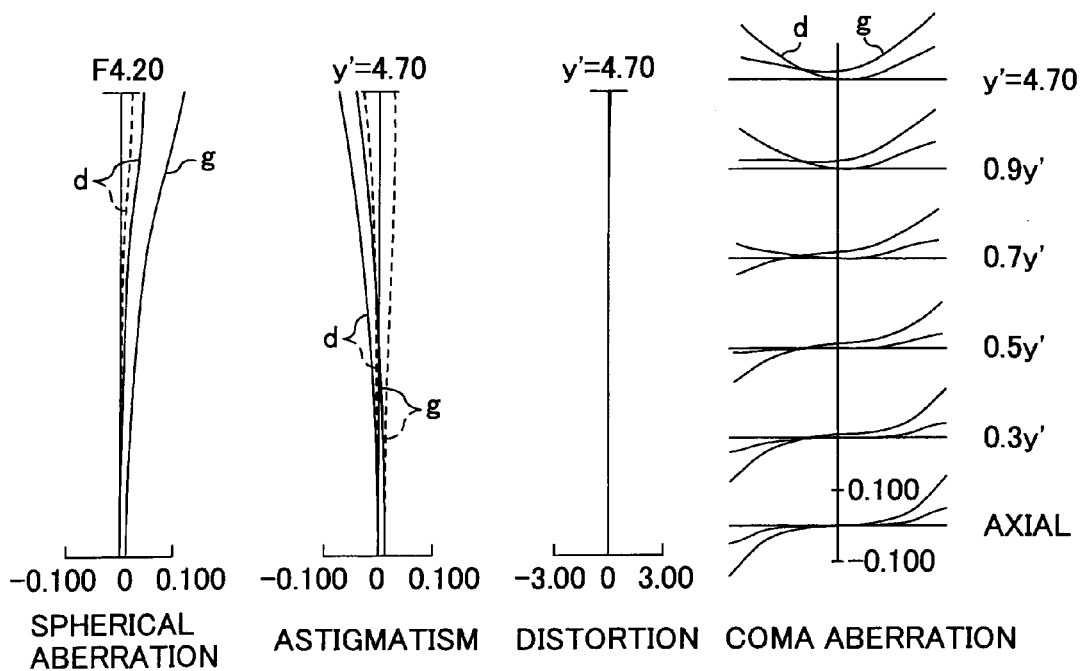
FIG. 20 is an aberration curve showing the spherical aberration, astigmatism, distortion, and coma aberration at the telephoto end, of the zoom lens relating to the embodiment 5 illustrated in FIG. 5.

FIG. 18 through FIG. 20 show the aberration curves of the spherical aberration, astigmatism, distortion, and coma aberration of the zoom lens illustrated in FIG. 5 relating to the aforementioned embodiment 5, in which FIG. 18 shows the aberration curve at the wide-angle end, FIG. 19 shows the aberration curve at the medium focal length, and FIG. 20 shows the aberration curve at the telephoto end. In each of the aberration curves, the dashed line in the spherical aberration curve represents the sine condition; the solid line in the astigmatism curve represents the sagittal, and the dashed line represents the meridional; and the thick line represents d-line, and the thin line represents g-line.

The aberration curves shown in FIG. 6 through FIG. 20 confirm that the aberrations are satisfactorily corrected or repressed in the zoom lenses having the configurations illustrated in FIG. 1 through FIG. 5 relating to the embodiment 1 through the embodiment 5 of the present invention.

Model of Embodiment

Figure 21A:
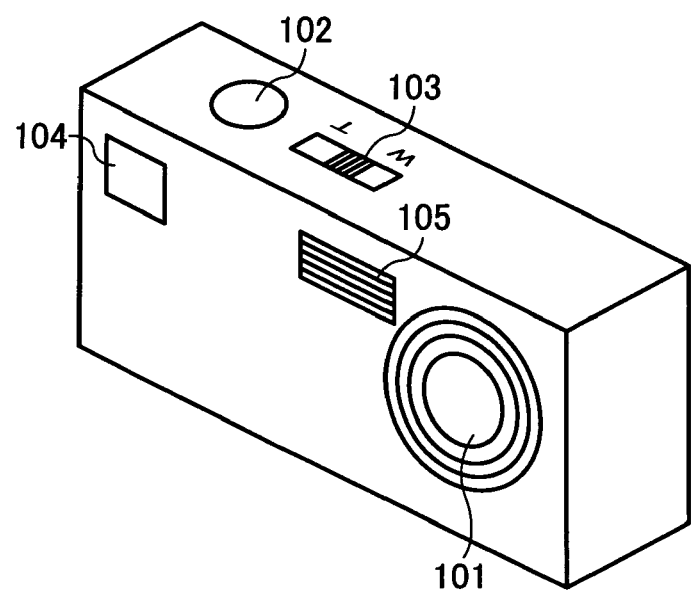
FIG. 21A is a perspective view typically illustrating an appearance of the camera relating to the model of embodiment of the present invention, viewed from the object side with a state that a photographing lens is in a collapsed state inside the camera body.
Figure 21B:
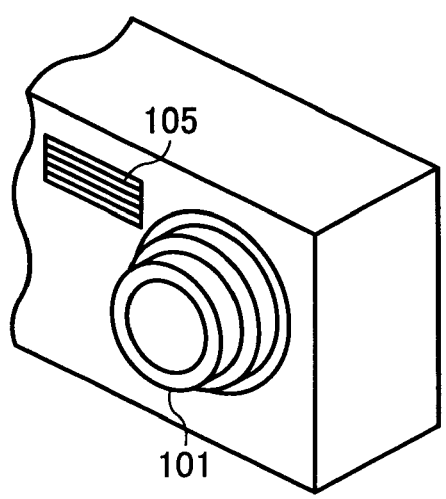
FIG. 21B is a perspective view typically illustrating an appearance of the camera relating to the model of embodiment of the present invention, viewed from the object side with a state that the photographing lens protrudes from the camera body.
Figure 22:
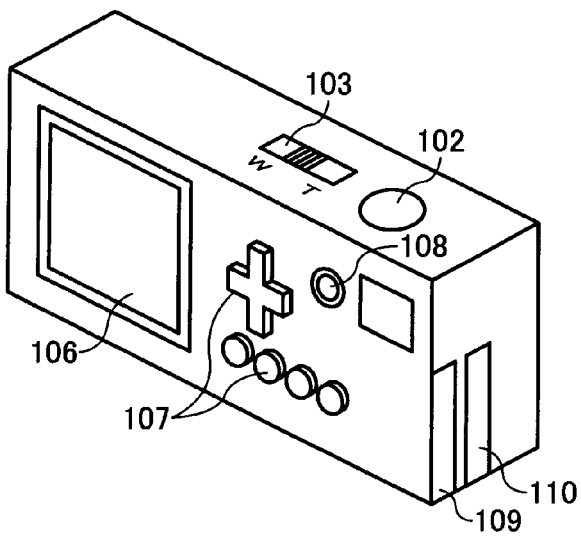
FIG. 22 is a perspective view typically illustrating an appearance of the camera illustrated in FIG. 21, viewed from the photographer side.
Figure 23:
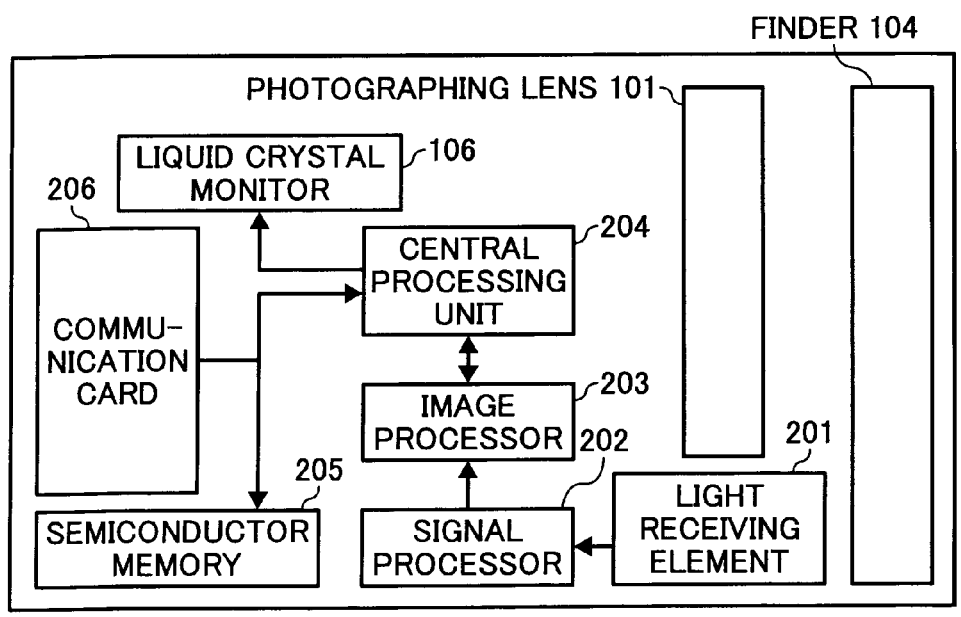
FIG. 23 is a block diagram typically illustrating the functional configuration of the camera illustrated in FIG. 21.

A model of embodiment relating to the present invention wherein a camera is made up by adopting the zoom lens of the aforementioned embodiment 1 through the embodiment 5 as the photographing optical system will be described with reference to FIG. 21 through FIG. 23. FIG. 21 is a perspective view illustrating an appearance of the camera viewed from the front side being the subject side, in which FIG. 21A illustrates a state that the photographing lens is in a collapsed state inside the camera body, and FIG. 21B illustrates a state that the photographing lens protrudes from the camera body. FIG. 22 is a perspective view illustrating an appearance of the camera viewed from the back side being the photographer side. FIG. 23 is a block diagram illustrating the functional configuration of the camera. The description here relates the camera; however, in recent years appear an incorporation of a camera function into the so-called PDA (personal digital assistant), and a personal digital assistant such as a portable telephone. Such a personal digital assistant includes substantially the same function and configuration as the camera, although the appearance is a little different, and it is advisable to apply the zoom lens relating to the present invention to such a personal digital assistant.

As illustrated in FIGS. 21A, 21B and FIG. 22, the camera includes a photographing lens 101, shutter button 102, zoom lever 103, finder 104, electric flash 105, liquid crystal monitor 106, operation buttons 107, power switch 108, memory cord slot 109, and communication card slot 110, etc.

As illustrated in FIG. 23, the camera further includes a light receiving element 201, signal processor 202, image processor 203, central processing unit 204, semiconductor memory 205, and communication card 206, etc.

The camera has the photographing lens 101 and the light receiving element 201 as an area sensor such as a CCD (charge coupled device) imaging device, which is configured such that the light receiving element 201 reads the image of a photographing object, namely, a subject that is formed by the photographing lens 101 that is imagining optical system. The zoom lens relating to the present invention as described in the first embodiment through the fifth embodiment is used as the photographing lens 101.

The output from the light receiving element 201 is processed by the signal processor 202 controlled by the central processing unit 204, and the resultant is converted into digital image information. The image information digitized by the signal processor 202 experiences a predetermined image processing in the image processor 203 also controlled by the central processing unit 204; thereafter, the resultant is recorded in the semiconductor memory 205 such as a non-volatile memory. The semiconductor memory 205 in this case may be a memory card loaded in the memory card slot 109, or a semiconductor memory built in the camera body. The liquid crystal monitor 106 can display an image now being photographed as well as an image being recorded in the semiconductor memory 205. The image being recorded in the semiconductor memory 205 can be transmitted to the outside through the communication card 206 loaded in the communication card slot 110.

While a user carries the camera, the photographing lens 101 is in a collapsed state inside the camera body, as shown in FIG. 21A; as the user powers it by operating the power switch 108, the camera cone is pulled out as shown in FIG. 21B and is protruded from the camera body. At this moment, the optical system of each lens group configuring the zoom lens assumes the configuration at the wide-angle end, for example, inside the camera cone of the photographing lens 101. By operating the zoom lever 103, the configuration of the optical system of each lens group is varied, and the user is able to vary the power toward the telephoto end. Here, the optical system of the finder 104 is desirable to vary the power, interlocking with the variation of angular field of the photographing lens 101.

In most cases, a half-pressing of the shutter button 102 will make a focusing. In regard to the zoom lens relating to the embodiment of the present invention or described in the embodiment 1 through the embodiment 5, the focusing is made by the movement of the first lens group G1 and the movement of the light receiving element; or in the zoom lens relating to the embodiment 1 through the embodiment 4, the focusing is made by the movement of the third lens group G3. Further pressing the shutter button 102 into the full pressing will perform a photographing; thereafter, the above mentioned processing is performed.

For displaying the image recorded in the semiconductor memory 205 on liquid crystal monitor 106, or for transmitting it to the outside through the communication card 206, the user operates the operation buttons 107 as predetermined. When using the semiconductor memory 205 and the communication card 206, etc., the user inserts them into the dedicated or universal slots such as memory cord slot 109 or communication card slot 110.

When the photographing lens 101 is in a collapsed state inside the camera body, each lens group of the zoom lens is not necessarily placed in a row on the optical axis. If a mechanism is made such that, when the photographing lens 101 is in a collapsed state, at least one of the second lens group G2 and the third lens group G3 is evacuated from the optical axis and is stored in parallel to the other lens groups, a further thinning of the camera will be achieved.

The photographing lens 101 configured with the zoom lens as described in the embodiment 1 through the embodiment 5 can be applied to the above mentioned camera or the personal digital assistant, as the photographing optical system thereof. Therefore, a high image-quality and small sized camera or personal digital assistant can be realized by using a light receiving element of 8-10 million pixel-level.

According to one embodiment of the present invention, the zoom lens is configured such that a first lens group having a negative refracting power and a second lens group having a positive refracting power are disposed in order from an object side, and at least, both the first lens group and the second lens group move along with changing magnification from a wide-angle end toward a telephoto end, in a manner that a spacing between the first lens group and the second lens group decreases and a spacing between the second lens group and an image surface increases. Thereby, the invention is able to provide a zoom lens capable of effectively controlling various aberrations without a remarkable increase of the manufacturing cost, achieving a sufficiently wide angle of view at the wide-angle end, and realizing a smaller size as well as a higher resolving power. Also the invention is able to provide a camera and a personal digital assistant using such a zoom lens.

More particularly, the zoom lens includes: a first lens group having a negative refracting power, a second lens group having a positive refracting power disposed in order from an object side, and an aperture stop that moves in one united body with the second lens group on the object side of the second lens group, in which, at least, both the first lens group and the second lens group move along with changing magnification from a wide-angle end toward a telephoto end, in a manner that a spacing between the first lens group and the second lens group decreases and a spacing between the second lens group and an image surface increases, wherein the second lens group includes a first cemented lens having at least three pieces of lenses united, and a second cemented lens having at least two pieces of lenses united. Being thus configured, the zoom lens becomes capable of attaining a sufficiently wide half angle of view of 42 degrees or more at the wide-angle end, satisfactorily correcting a chromatic aberration, especially, a power chromatic aberration and a coma aberration, and achieving a resolving power corresponding to an imaging device having 8 to 10 million pixels or more, with a smaller size.

According to one embodiment of the present invention, the zoom lens includes: a first lens group having a negative refracting power, a second lens group having a positive refracting power, a third lens group having a positive refracting power disposed in order from an object side, and an aperture stop that moves in one united body with the second lens group on the object side of the second lens group, in which, at least, both the first lens group and the second lens group move along with changing magnification from a wide-angle end toward a telephoto end, in a manner that a spacing between the first lens group and the second lens group decreases and a spacing between the second lens group and the third lens group increases, wherein the second lens group includes a first cemented lens having at least three pieces of lenses united, and a second cemented lens having at least two pieces of lenses united. By this configuration, the zoom lens becomes capable of attaining a sufficiently wide half angle of view of 42 degrees or more at the wide-angle end, satisfactorily correcting the chromatic aberration, especially, the power chromatic aberration and the coma aberration, securing an eye point height and simplifying a focusing mechanism, and achieving the resolving power corresponding to an imaging device having 8 to 10 million pixels or more, with a smaller size.

According to one embodiment of the present invention, the zoom lens includes such a configuration that the second cemented lens is disposed on an image side of the first cemented lens, both a most object side surface of the first cemented lens and a most image side surface of the first cemented lens are convex toward the object side, and the second cemented lens has a positive refracting power as a whole. Thereby, the zoom lens becomes capable of satisfactorily correcting a monochromic aberration, such as a spherical aberration and astigmatism and so forth, for a higher performance.

According to one embodiment of the present invention, the zoom lens includes such a configuration that the second cemented lens is disposed on an image side of the first cemented lens; the first cemented lens has three pieces of a positive lens, a negative lens, and a positive lens disposed and mutually united in order from the object side; and the second cemented lens has a positive refracting power as a whole. Thereby, the zoom lens becomes capable of easily attaining a wider angle of view, while maintaining a high performance.

According to one embodiment of the present invention, the zoom lens satisfies the conditional expressions of: $1.65 < n_{c1-1} < 1.90$, $1.65 < n_{c1-2} < 1.90$, $4 < v_{c1-1} - v_{c1-2} < 25$, and $68 < v_{c1-3} < 98$, wherein $n_{c1-1}$ is a refractive index of the positive lens on the object side of the first cemented lens, $n_{c1-2}$ is a refractive index of the negative lens of the first cemented lens, $v_{c1-1}$ is an Abbe number of the positive lens on the object side of the first cemented lens, $v_{c1-2}$ is an Abbe number of the negative lens of the first cemented lens, and $v_{c1-3}$ is an Abbe number of the positive lens on the image side of the first cemented lens. Thereby, the zoom lens becomes capable of satisfactorily correcting the chromatic aberration for a higher performance.

According to one embodiment of the present invention, the zoom lens satisfies the conditional expression of: $0.10 < d_{c1-2}/d_{c1-all} < 0.19$, wherein $d_{c1-2}$ is a central thickness (thickness measured along the optical axis) of the negative lens of the first cemented lens, and $d_{c1-all}$ is a central thickness of all the lenses of the first cemented lens. Thereby, the degree of difficulty in processing a cemented lens becomes decreased even in a smaller size and the zoom lens can easily be manufactured.

According to one embodiment of the present invention, the zoom lens satisfies the conditional expressions of: $0.2 < (R_{c1-1} - R_{c1-3})/(R_{c1-1} + R_{c1-3}) < 0.5$, and $-0.4 < (R_{c1-3} - R_{c1-4})/$ $(R_{c1-3}+R_{c1-4})<-0.1$, wherein $R_{c1-1}$ is a curvature radius of a surface on the most object side of the first cemented lens, $R_{c1-3}$ is a curvature radius of a united surface on the image side of two united surfaces of the first cemented lens, and $R_{c1-4}$ is a curvature radius of a surface on the most image side of the first cemented lens. Thereby, the zoom lens becomes capable of satisfactorily correcting both the monochromic aberration and the chromatic aberration for a higher performance.

According to one embodiment of the present invention, the zoom lens includes such a configuration that the second cemented lens is disposed on an image side of the first cemented lens, and the second cemented lens has two pieces of a negative lens and a positive lens disposed and mutually united in order from the object side, and the zoom lens satisfies the conditional expression of: $68<v_{c2-2}<98$, wherein $v_{c2-2}$ is an Abbe number of the positive lens of the second cemented lens. Thereby, the zoom lens becomes capable of satisfactorily correcting the power chromatic aberration for a higher performance.

According to one embodiment of the present invention, the zoom lens includes such a configuration that the second cemented lens is disposed on an image side of the first cemented lens, and at least one piece of positive lens is disposed on the object side of the first cemented lens. Thereby, the zoom lens becomes capable of satisfactorily correcting various aberrations for a higher performance.

According to one embodiment of the present invention, the zoom lens includes such a configuration that at least one piece of the positive lens disposed on the object side of the first cemented lens has at least one aspherical surface. Thereby, the zoom lens becomes capable of satisfactorily correcting the spherical aberration and coma aberration for a higher performance.

According to one embodiment of the present invention, the zoom lens includes such a configuration that the first cemented lens is made up only with spherical surfaces, and the second lens group includes at least one aspherical surface. Thereby, the zoom lens becomes capable of repressing the influence of decentering while three lenses are united in manufacturing, securing a stabilized performance, and satisfactorily correcting the spherical aberration and coma aberration for a higher performance.

According to one embodiment of the present invention, the camera includes the zoom lens a photographing optical system; thereby, the camera can be made up into a smaller size with a higher quality of images by a high resolving power, by using the zoom lens provided with the capability of attaining the sufficiently wide half angle of view of 42 degrees or more at the wide-angle end, satisfactorily correcting the chromatic aberration, especially, the power chromatic aberration and the coma aberration, and achieving the resolving power corresponding to an imaging device having 8 to 10 million pixels or more, with a smaller size.

According to one embodiment of the present invention, the personal digital assistant includes the zoom lens as a photographing optical system of a camera functional part; thereby, the personal digital assistant can be made up into a smaller size and a higher quality of images by a high resolving power at low cost, by using the zoom lens provided with the capability of attaining the sufficiently wide half angle of view of 42 degrees or more at the wide-angle end, satisfactorily correcting the chromatic aberration, especially, the power chromatic aberration and the coma aberration, and achieving the resolving power corresponding to an imaging device having 8 to 10 million pixels or more, with a smaller size.

Although the present invention has been described in terms of exemplary embodiments, it is not limited thereto. It should be appreciated that variations may be made in the embodiments described by persons skilled in the art without departing from the scope of the present invention as defined by the following claims. In addition, the number, position, shape, or the like of the components are not limited to the above embodiments, and can be changed to a number, position, shape or the like of components preferable for conducting the present invention. Moreover, no element or component in the present disclosure is intended to be dedicated to the public regardless of whether the element or component is explicitly recited in the following claims.

What is claimed is:

1. A zoom lens, comprising:
   a first lens group having a negative refracting power;
   a second lens group having a positive refracting power;
   a third lens group having a positive refracting power, the first lens group, the second lens group and the third lens group disposed in order from an object side; and
   an aperture stop disposed on the object side of the second lens group, moving with the second lens group,
   wherein along with changing magnification from a wide-angle end toward a telephoto end, at least the first lens group and the second lens group move, in a manner that a spacing between the first lens group and the second lens group decreases and a spacing between the second lens group and the third lens group increases, and
   the second lens group, comprising:
   a first cemented lens having at least three pieces of lenses united; and
   a second cemented lens having at least two pieces of lenses united.

2. A zoom lens according to claim 1, wherein the second cemented lens is disposed on an image side of the first cemented lens, both a most object side surface of the first cemented lens and a most image side surface of the first cemented lens are convex toward the object side, and the second cemented lens has a positive refracting power as a whole.

3. A zoom lens according to claim 1, wherein the second cemented lens is disposed on an image side of the first cemented lens, the first cemented lens has three pieces of a positive lens, a negative lens, and a positive lens disposed and mutually united in order from the object side, and the second cemented lens has a positive refracting power as a whole.

4. A zoom lens according to claim 3, satisfying the conditional expressions of:

$1.65<n_{c1-1}<1.90$, $1.65<n_{c1-2}<1.90$, $4<v_{c1-1}-v_{c1-2}<25$, and $68<v_{c1-3}<98$, wherein $n_{c1-1}$ is a refractive index of the positive lens on the object side of the first cemented lens, $n_{c1-2}$ is a refractive index of the negative lens of the first cemented lens, $v_{c1-1}$ is an Abbe number of the positive lens on the object side of the first cemented lens, $v_{c1-2}$ is an Abbe number of the negative lens of the first cemented lens, and $V_{c1-3}$ is an Abbe number of the positive lens on the image side of the first cemented lens.

5. A zoom lens according to claim 3, satisfying the conditional expression of:

$0.10<d_{c1-2}/d_{c1-all}<0.19$, wherein $d_{c1-2}$ is a central thickness of the first cemented lens, which is a thickness measured along an optical axis of a lens, of the negative lens, and $d_{c1-all}$ is a central thickness of all the lenses of the first cemented lens.

6. A zoom lens according to claim 3, satisfying the conditional expressions of:

$$0.2<(R_{c1-1}-R_{c1-3})/(R_{c1-1}+R_{c1-3})<0.5, \text{ and}$$

$$-0.4<(R_{c1-3}-R_{c1-4})/(R_{c1-3}+R_{c1-4})<-0.1,$$

wherein $R_{c1-1}$ is a curvature radius of a surface on the most object side of the first cemented lens, $R_{c1-3}$ is a curvature radius of a united surface on the image side of two united surfaces of the first cemented lens, and $R_{c1-4}$ is a curvature radius of a surface on the most image side of the first cemented lens.

7. A zoom lens according to claim 1, wherein the second cemented lens is disposed on an image side of the first cemented lens, and the second cemented lens has two pieces of a negative lens and a positive lens disposed and mutually united in order from the object side, and the zoom lens satisfying the conditional expression of:

$$68<v_{c2-2}<98,$$

wherein $v_{c2-2}$ is an Abbe number of the positive lens of the second cemented lens.

8. A zoom lens according to claim 1, wherein the second cemented lens is disposed on an image side of the first cemented lens, and at least one piece of positive lens is disposed on the object side of the first cemented lens.

9. A zoom lens according to claim 8, wherein at least one piece of the positive lens disposed on the object side of the first cemented lens has at least one aspherical surface.

10. A zoom lens according to claim 1, wherein the first cemented lens is configured only with spherical surfaces and the second lens group includes at least one aspherical surface.

* * * * *